US012092771B2

United States Patent
Couture et al.

(10) Patent No.: US 12,092,771 B2
(45) Date of Patent: Sep. 17, 2024

(54) SYSTEMS, METHODS AND APPARATUSES FOR CALIBRATING SENSORS MOUNTED ON A DEVICE

(71) Applicant: Brain Corporation, San Diego, CA (US)

(72) Inventors: Simon Couture, San Diego, CA (US); Avi Halpern, San Diego, CA (US); Thomas Hrabe, San Diego, CA (US); Matt Atlas, San Diego, CA (US)

(73) Assignee: Brain Corporation, San Diego, CA (US)

( * ) Notice: Subject to any disclaimer, the term of this patent is extended or adjusted under 35 U.S.C. 154(b) by 783 days.

(21) Appl. No.: 17/216,775

(22) Filed: Mar. 30, 2021

(65) Prior Publication Data

US 2021/0215811 A1 Jul. 15, 2021

Related U.S. Application Data

(63) Continuation-in-part of application No. 17/142,669, filed on Jan. 6, 2021, which is a continuation of application No. PCT/US2019/040237, filed on Jul. 2, 2019.

(60) Provisional application No. 62/694,679, filed on Jul. 6, 2018.

(51) Int. Cl.
| | |
|---|---|
| *G01S 7/497* | (2006.01) |
| *G01S 17/894* | (2020.01) |
| *G01S 17/931* | (2020.01) |
| *G05D 1/00* | (2006.01) |
| *G06T 7/80* | (2017.01) |

(Continued)

(52) U.S. Cl.
CPC .......... *G01S 7/4972* (2013.01); *G01S 17/894* (2020.01); *G01S 17/931* (2020.01); *G05D 1/0238* (2013.01); *G06T 7/80* (2017.01); *B25J 9/1692* (2013.01); *G01D 18/00* (2013.01)

(58) Field of Classification Search
USPC .......................................................... 701/33.1
See application file for complete search history.

(56) References Cited

U.S. PATENT DOCUMENTS

| | | | |
|---|---|---|---|
| 2006/0271332 A1* | 11/2006 | Loferer | G01B 21/042 |
| | | | 702/150 |
| 2011/0212549 A1 | 9/2011 | Chen | |
| 2012/0140202 A1 | 6/2012 | Rothenberger | |

(Continued)

FOREIGN PATENT DOCUMENTS

| | | |
|---|---|---|
| CN | 106597417 A | 4/2017 |
| DE | 102014117104 A1 | 5/2016 |

(Continued)

OTHER PUBLICATIONS

International Search Report and Written Opinion dated Nov. 19, 2019 for PCT/US19/40237.

(Continued)

*Primary Examiner* — Paul D Lee
(74) *Attorney, Agent, or Firm* — Reed Smith LLP; Sidharth Kapoor

(57) ABSTRACT

Systems and methods for calibrating sensors of a robot are disclosed. In one exemplary implementation, an environment comprising a plurality of sensor targets and a fixed position for a robot allows for faster, more accurate calibration of a robot's sensors.

16 Claims, 24 Drawing Sheets

(51) Int. Cl.
  *B25J 9/16*     (2006.01)
  *G01D 18/00*   (2006.01)

(56) References Cited

U.S. PATENT DOCUMENTS

| | | | |
|---|---|---|---|
| 2013/0010081 A1* | 1/2013 | Tenney | H04N 13/20 |
| | | | 348/47 |
| 2015/0036027 A1 | 2/2015 | Winterot et al. | |
| 2017/0151671 A1* | 6/2017 | Ishige | B25J 9/1692 |
| 2018/0161983 A1* | 6/2018 | Yamaguchi | B25J 19/023 |
| 2018/0194007 A1* | 7/2018 | Namiki | B25J 19/04 |
| 2018/0196126 A1 | 7/2018 | Liu et al. | |
| 2019/0244378 A1* | 8/2019 | Dong | G06T 5/80 |

FOREIGN PATENT DOCUMENTS

| | | |
|---|---|---|
| EP | 1110055 A1 | 6/2001 |
| EP | 2096460 A2 | 9/2009 |
| EP | 2767846 A1 | 8/2014 |
| EP | 2916104 B1 | 6/2018 |

OTHER PUBLICATIONS

European Supplemental Search Report dated Feb. 4, 2022 for EP3818341.

\* cited by examiner

| Sensor | Ideal Pose (Based on CAD Model) | | | | | | Measured Pose (Based on sensor data) | | | | | |
|---|---|---|---|---|---|---|---|---|---|---|---|---|
| Front LiDAR | $X_1$ | $Y_1$ | $Z_1$ | $Yaw_1$ | $Pitch_1$ | $Roll_1$ | $X_1'$ | $Y_1'$ | $Z_1'$ | $Yaw_1'$ | $Pitch_1'$ | $Roll_1'$ |
| Slant LiDAR | $X_2$ | $Y_2$ | $Z_2$ | $Yaw_2$ | $Pitch_2$ | $Roll_2$ | $X_2'$ | $Y_2'$ | $Z_2'$ | $Yaw_2'$ | $Pitch_2'$ | $Roll_2'$ |
| Planar LiDAR | . | . | . | . | . | . | . | . | . | . | . | . |
| Rear Depth Camera | | | | | | | | | | | | |
| Sensor n | $X_n$ | $Y_n$ | $Z_n$ | $Yaw_n$ | $Pitch_n$ | $Roll_n$ | $X_n'$ | $Y_n'$ | $Z_n'$ | $Yaw_n'$ | $Pitch_n'$ | $Roll_n'$ |

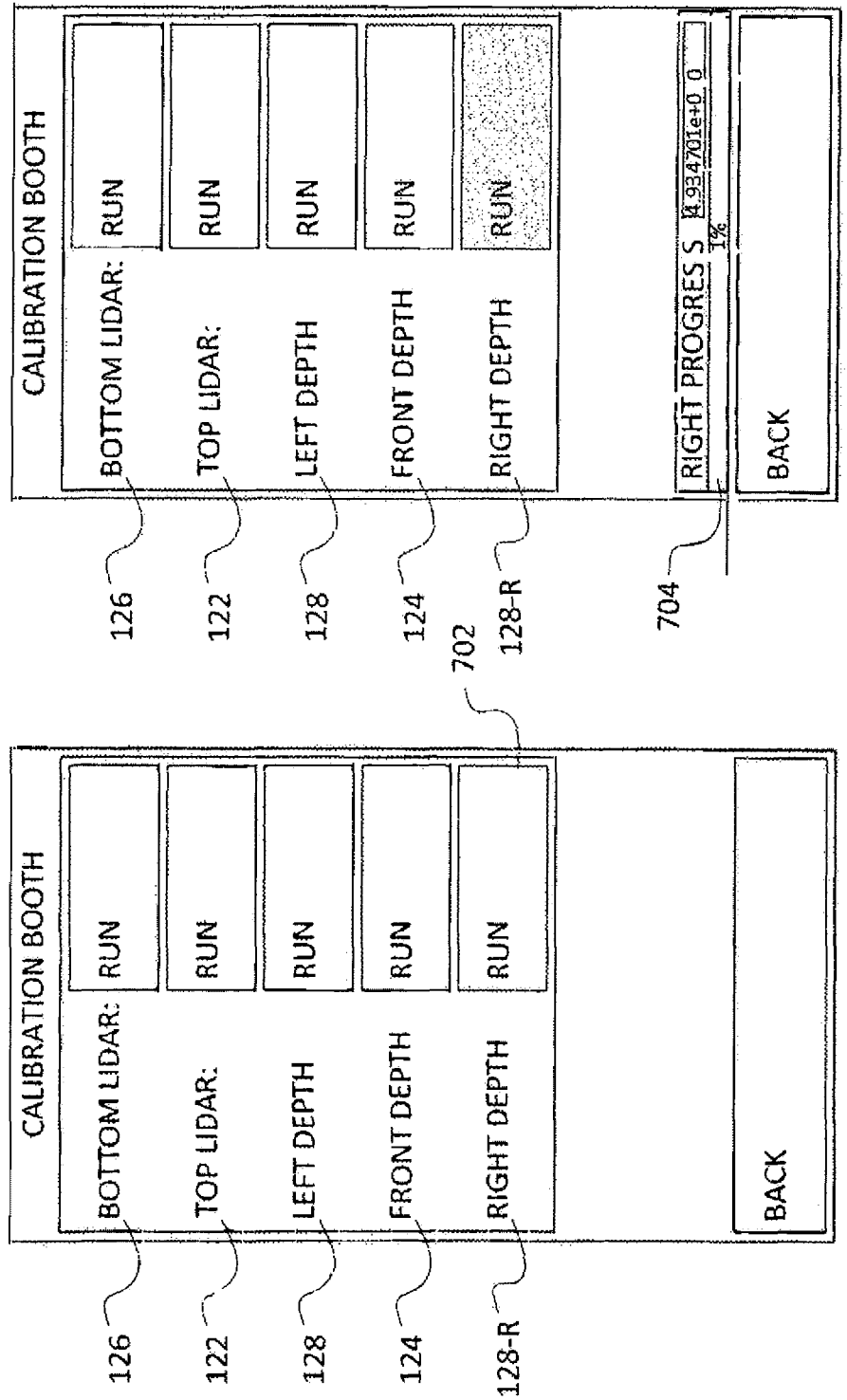

SYSTEMS, METHODS AND APPARATUSES FOR CALIBRATING SENSORS MOUNTED ON A DEVICE

CROSS-REFERENCE TO RELATED APPLICATIONS

The present application is a Continuation-In-Part of U.S. application Ser. No. 17/142,669, filed Jan. 6, 2021, which claims priority to International Application No. PCT/US19/40237, filed Jul. 2, 2019, which claims priority to U.S. Provisional Application No. 62/694,679, filed Jul. 6, 2018, the disclosures of each of which is incorporated herein by reference in their entirety.

COPYRIGHT

A portion of the disclosure of this patent document contains material that is subject to copyright protection. The copyright owner has no objection to the facsimile reproduction by any one of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for calibrating robotic sensors.

Background

Currently, robots may comprise of a plurality of sensors to accomplish complex tasks, which require accurate calibration. These robots may utilize these sensors to navigate their environment, identify nearby objects, and gather data about their environment. In some exemplary embodiments, calibration is done individually with each sensor. In some exemplary embodiments, a robot may contain many types of sensors, requiring different calibration methods for each. This method of calibration may require an operator to perform multiple tests in multiple locations to calibrate a robot's sensors. However, these sensors may be especially difficult and time consuming to calibrate when a robot contains many and/or many types of sensors.

By means of non-limiting illustrative examples, to calibrate a robot with multiple light detection and ranging (LIDAR) sensors may require positioning and repositioning multiple target objects around the robot to calibrate the sensors. This method of calibration may require many measurements to be taken regarding the many positions of the target object(s) which may be time consuming and inefficient. The systems, methods and apparatuses of the present disclosure improve the efficiency and accuracy of calibrating a robot's sensors utilizing an environment comprising a fixed position for the robot and a plurality of sensor targets. The plurality of targets may allow for multiple sensors of a robot and/or multiple robots to be calibrated without any additional measurements or repositioning of targets.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification.

SUMMARY

The foregoing needs are satisfied by the present disclosure, which provides for, inter alia, systems, methods and apparatuses for calibrating sensors mounted on a device, for example, a robot. In some exemplary embodiments, the robot calibration system may comprise a room or space with a plurality of sensor targets at known distances. The robot will utilize its sensors to find the targets, and comparisons are made between sensor data and measurements.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a robot is disclosed. The robot comprises: at least one sensor coupled thereto: and at least one controller configured to execute computer readable instructions to: capture data from the at least one sensor, the data represents at least one sensor target sensed within the field of view of the at least one sensor: determine a difference between the representation of the at least one sensor target in the data and a reference, the reference corresponds to sensor data of the at least one sensor target from a calibrated sensor: and determine at least one transform for each of the respective at least one sensors based on the difference, the at least one transform causes data from the at least one sensor to match the reference.

According to at least one non-limiting exemplary embodiment, the robot is affixed to a predetermined location prior to capturing data from the at least one sensor.

According to at least one non-limiting exemplary embodiment, the at least one sensor target includes a plurality of two-dimensional rings.

According to at least one non-limiting exemplary embodiment, the plurality of two-dimensional rings are arranged in an asymmetrical pattern.

According to at least one non-limiting exemplary embodiment, the at least one sensor is configured to capture images of the sensor target: and the difference corresponds to discrepancies between one or more of the shape, size, and location of the plurality of rings in the captured images and their respective shape, size, and location in the reference.

According to at least one non-limiting exemplary embodiment, capture the sensor data in response to a user input to a user interface.

According to at least one non-limiting exemplary embodiment, the at least one visual target includes a plurality of two-dimensional, black and white shapes arranged in an asymmetrical pattern.

According to at least one non-limiting exemplary embodiment, an environment for calibrating sensors on a robot is disclosed. The environment comprises: a fixed location to secure the robot, the robot being configured to collect data from at least one sensor unit from the fixed location; and at least one visual target, the at least one visual target includes a plurality of two-dimensional shapes, the plurality of rings being detectable by the at least one sensor unit of the robot.

According to at least one non-limiting exemplary embodiment, the plurality of two-dimensional shapes are arranged in an asymmetric pattern.

According to at least one non-limiting exemplary embodiment, the plurality of two-dimensional shapes are black and white.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4 is an illustrative data table of storing the measured sensor data and ideal CAD model data according to an exemplary embodiment.

FIGS. 7A-C are illustrative examples of user interfaces displayed on a device according to an exemplary embodiment.

Figure 1A:
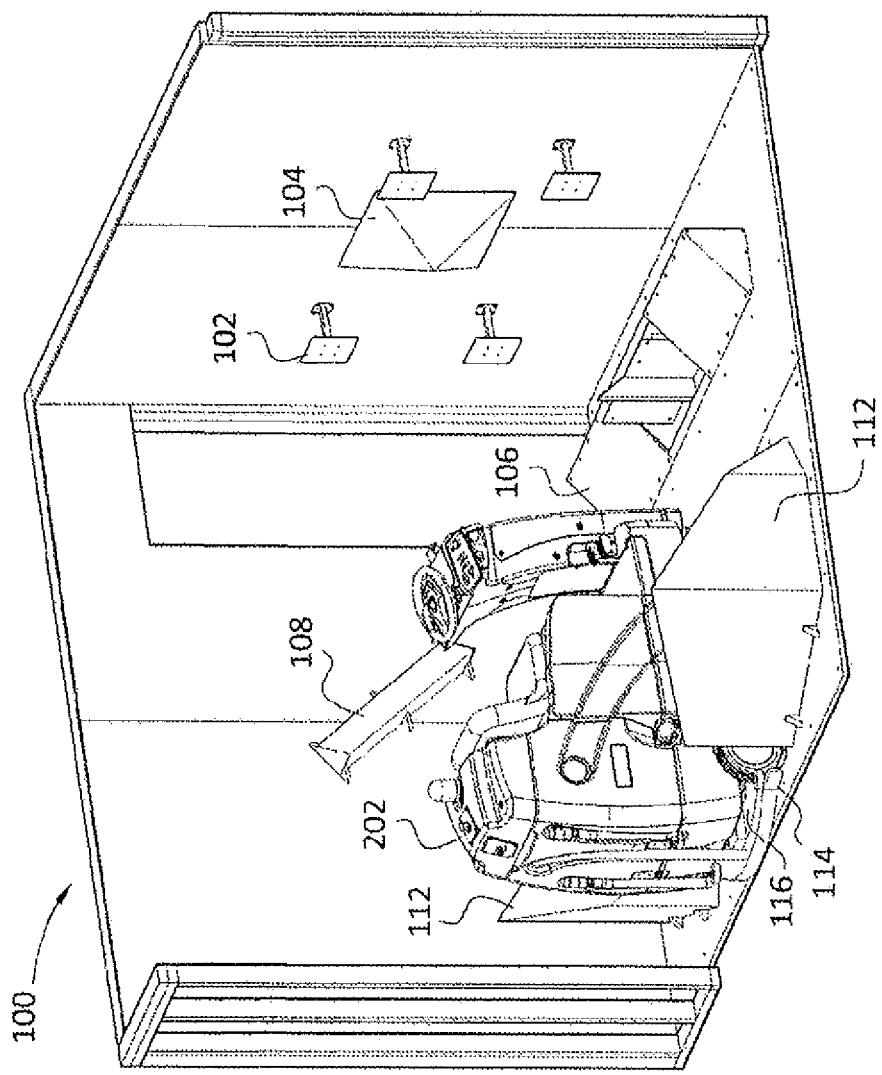
FIG. 1A is a view of a calibration environment comprising a plurality of sensor targets and a robot with at least one sensor to be calibrated according to an exemplary embodiment.

All Figures disclosed herein are @ Copyright 2021 Brain Corporation. All rights reserved.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented, or a method may be practiced, using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved calibration methods for robot sensors. In particular, some implementations of the present disclosure relate to robots. As used herein, a robot may include mechanical and/or virtual entities configured to carry out a complex series of actions automatically. In some cases, robots may be machines that are guided and/or instructed by computer programs and/or electronic circuitry. In some cases, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

Certain examples and implementations described herein with reference to robots and sensor calibration are used for illustration only, and the principles described herein may be readily applied to robotics generally.

Robots may include a plurality of sensors which must all be calibrated to ensure the robot functions properly. In cases where many sensors are present, it may be undesirable to calibrate each sensor individually, especially in cases where many robot's sensors need to be calibrated quickly. A calibration environment comprising multiple sensor targets may calibrate multiple sensors at once and may be rapidly reused for multiple robots.

Detailed descriptions of the various implementations and variants of the system and methods of the disclosure are now provided. While many examples discussed herein may refer to robotic floor cleaners, it will be appreciated that the described systems and methods contained herein are applicable to any kind of robot for any purpose and/or functionality. Myriad other example implementations or uses for the technology described herein would be readily envisaged by those having ordinary skill in the art, given the contents of the present disclosure.

Advantageously, the systems and methods of this disclosure allow for: (i) faster, more efficient calibration of robots: (ii) more accurate calibration of multiple identical robots: (iii) a variety of robots to be calibrated in the same room by specifically arranging sensor targets: and (iv) reduce resource costs, such as labor, time, space, and energy. Other advantages are readily discernable by one having ordinary skill in the art given the contents of the present disclosure.

As used herein, a calibration room may comprise either a physical or virtual space of a calibration environment wherein the calibration environment further comprises a specific geometry of arranged sensor targets, which are discussed in further detail below.

As used herein, an operator may encompass any operator of the robotic device that may determine the tasks that the system carries out and may create a calibration environment. According to one non-limiting exemplary embodiment, an operator of the robotic device may be non-human (e.g., another robot, artificial intelligence, etc.) with the capability of telling the robotic device what tasks to carry out (e.g., which sensor to calibrate). Additionally, the operator, human or non-human, may create a calibration environment comprising at least one sensor target, further illustrated below.

According to at least one non-limiting exemplary embodiment, a robot is disclosed. The robot comprises: at least one sensor coupled thereto: and at least one controller configured to execute computer readable instructions to: capture data from the at least one sensor, the data represents at least one sensor target sensed within the field of view of the at least one sensor: determine a difference between the representation of the at least one sensor target in the data and a reference, the reference corresponds to sensor data of the at least one sensor target from a calibrated sensor: and determine at least one transform for each of the respective at least one sensors based on the difference, the at least one transform causes data from the at least one sensor to match the reference.

According to at least one non-limiting exemplary embodiment, the robot is affixed to a predetermined location prior to capturing data from the at least one sensor.

According to at least one non-limiting exemplary embodiment, the at least one sensor target includes a plurality of two-dimensional rings.

According to at least one non-limiting exemplary embodiment, the plurality of two-dimensional rings are arranged in an asymmetrical pattern.

According to at least one non-limiting exemplary embodiment, the at least one sensor is configured to capture images of the sensor target: and the difference corresponds to discrepancies between one or more of the shape, size, and location of the plurality of rings in the captured images and their respective shape, size, and location in the reference.

According to at least one non-limiting exemplary embodiment, capture the sensor data in response to a user input to a user interface.

According to at least one non-limiting exemplary embodiment, the at least one visual target includes a plurality of two-dimensional, black and white shapes arranged in an asymmetrical pattern.

According to at least one non-limiting exemplary embodiment, an environment for calibrating sensors on a robot is disclosed. The environment comprises: a fixed location to secure the robot, the robot being configured to collect data from at least one sensor unit from the fixed location; and at least one visual target, the at least one visual target includes a plurality of two-dimensional shapes, the plurality of rings being detectable by the at least one sensor unit of the robot.

According to at least one non-limiting exemplary embodiment, the plurality of two-dimensional shapes are arranged in an asymmetric pattern.

According to at least one non-limiting exemplary embodiment, the plurality of two-dimensional shapes are black and white.

Figure 1B:
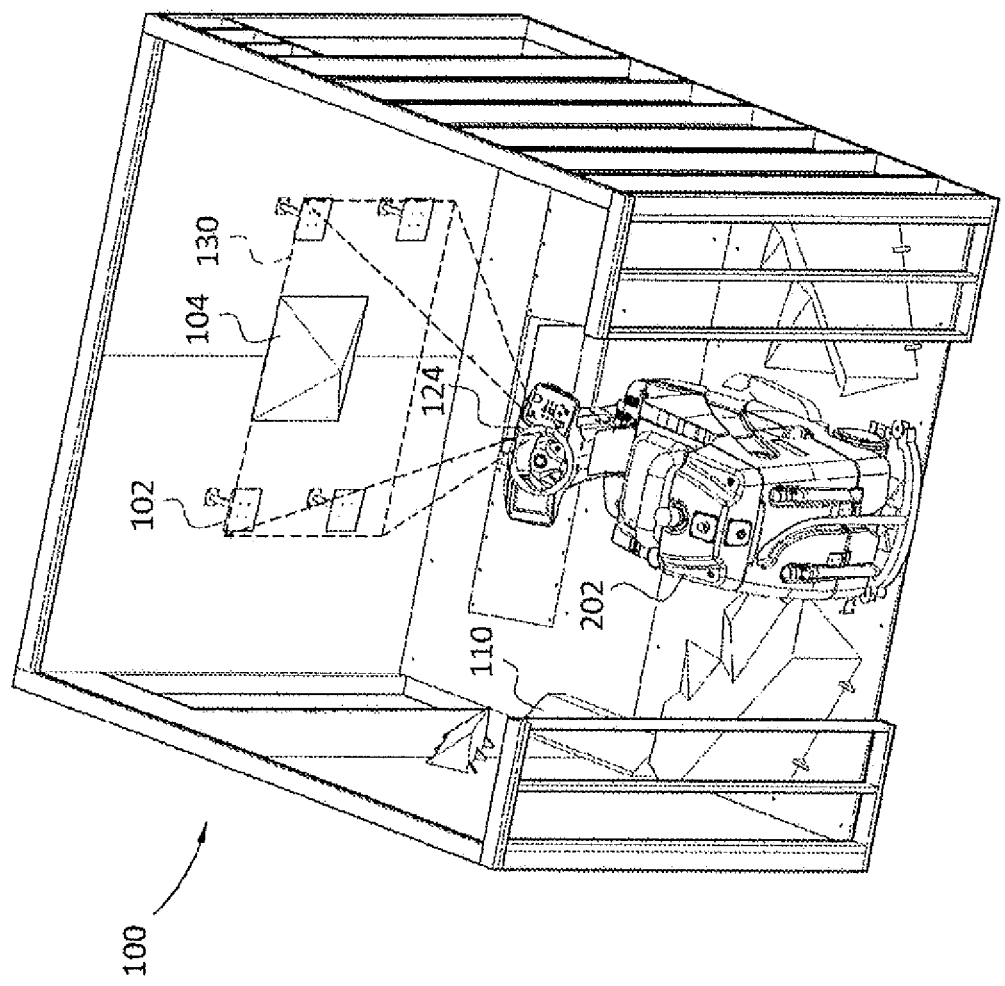
FIG. 1B is a view of a robot collecting data, using a sensor aimed at sensor targets, for calibrating the sensor according to an exemplary embodiment.
Figure 1C:
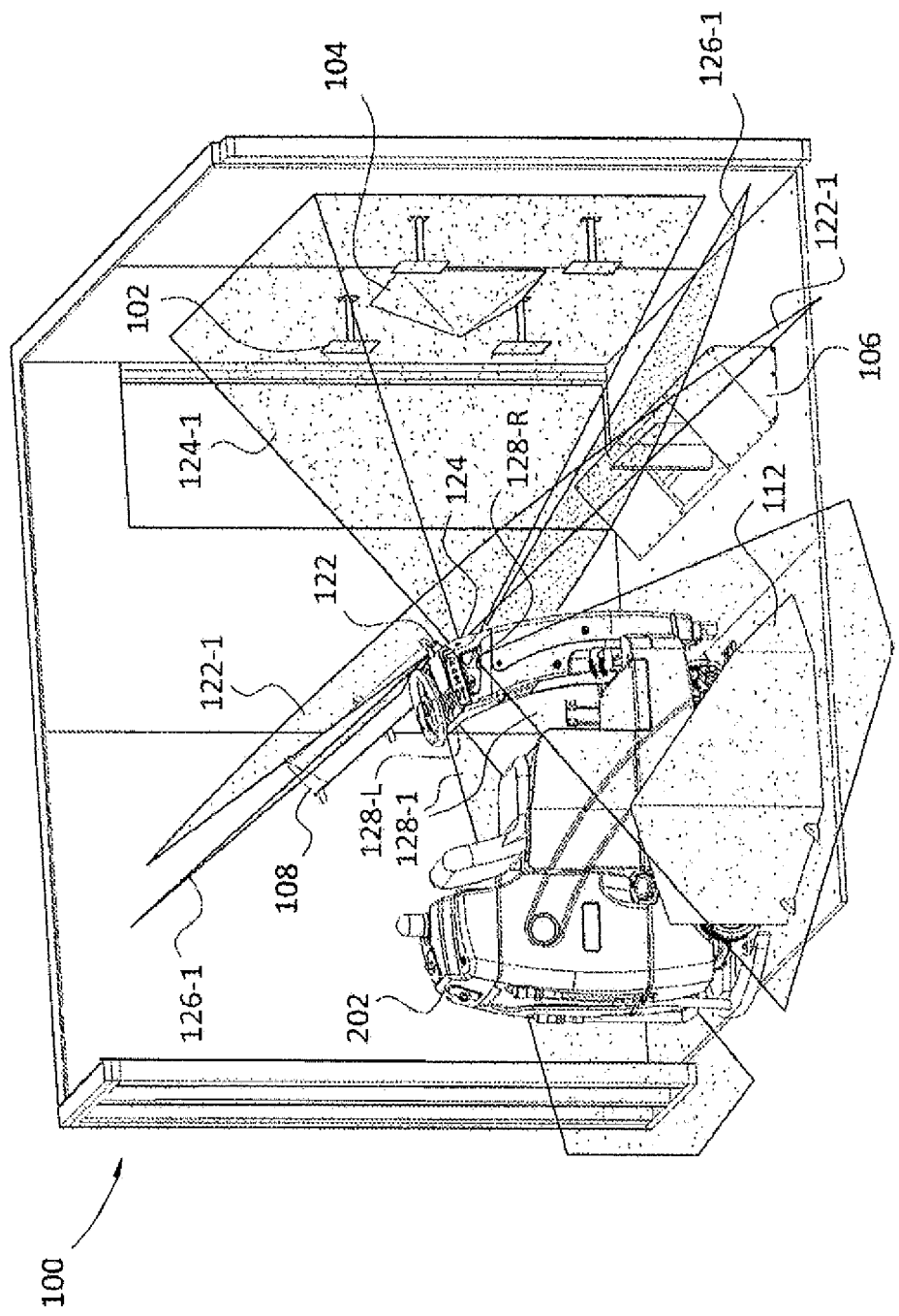
FIG. 1C is a view of the various fields of view projected by the various sensors on a robot according to an exemplary embodiment.
Figure 1D:
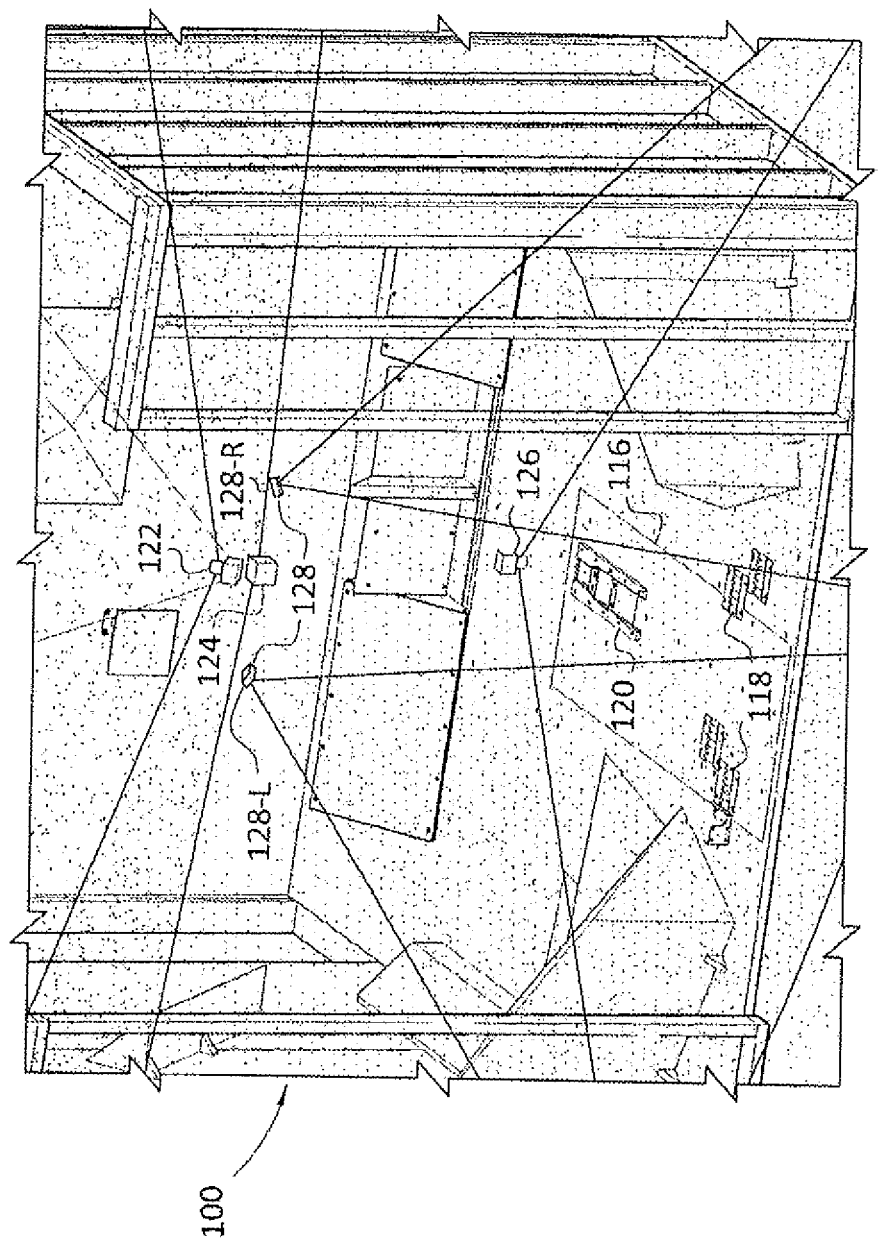
FIG. 1D is a view of the sensors used on a robotic device, without illustrating the robot, according to an exemplary embodiment.

FIG. 1A is a top view of a calibration room or calibration environment 100 according to an exemplary embodiment. One skilled in the art would appreciate that the calibration environment 100 may be within a physical space in a room or a building: or alternatively, the calibration environment 100 may be a computer-generated virtual representation of an actual physical space. The calibration environment 100 may comprise one, none, or a plurality of standoff targets 102, pyramid target 104, planar LIDAR and slanted LIDAR target 106, side slanted LIDAR targets 108, 110 (located on left and right sides of robot 202 as shown in FIG. 1B), and side depth camera targets 112 positioned just behind and on either side of the robot 202. Not illustrated in FIGS. 1A and 1B, but one skilled in the art would appreciate that side slanted LIDAR targets 110 may be placed along the wall opposite the present wall shown in FIGS. 1A and 1B. For purposes of clarity, the opposite facing side slanted LIDAR targets 108, 110, are omitted from illustration. The calibration environment 100 may further comprise a fixed position 116 for a robot 202 to be positioned during calibration, wherein fixed position 116 may further comprise a rear locking mechanism 114, rear wheel chock 118, and front wheel chock 120, as illustrated in FIG. 1D and further discussed below. One skilled in the art would appreciate that standoff targets 102, pyramid target 104, planar LIDAR and slanted LIDAR target 106, side slanted LIDAR targets 108, 110, and side depth camera targets 112, as discussed above, may be either physical structures or fixtures illustrated in FIG. 1A, or alternatively, may be digital representations or projections on a wall that provide similar functionality and purpose as the physical structures illustrated.

According to at least one non-limiting embodiment some, none, or additional targets may be added to the calibration room or environment 100 if more and/or different sensors are to be calibrated. As illustrated in FIG. 1A, fixed location 116 corresponds to securing the robot 202 in a fixed location while calibrating sensor units 214, shown in FIG. 2A. Discussed in further detail below and in reference to FIG. 2A, these sensor units 214 may include, for example, a front depth camera 124 (shown in FIG. 1C), a slanted LIDAR 122 (shown in FIG. 1C), a planar LIDAR 126 (shown in FIG. 1D), and left and right rear depth cameras 128-R and 128-L (shown in FIG. 1C).

Sensor targets 102, 104, 106, 108, 110, and 112, as discussed above, may be comprised of any material visible to the sensor units 214 of which it correspondingly calibrates. The type of material may include, but not be limited to, metal, plastic, foam, cardboard, powder coated material, matte coated materials, and/or any other material visible to the sensor. According to another non-limiting exemplary embodiment, sensor targets 102, 104, 106, 108, 110, and 112 may be different in shape, size, and/or color from the sensor targets illustrated in FIGS. 1A-E.

Next, referring to FIG. 1B, another perspective view of the calibration environment 100 is illustrated. FIG. 1B is an exemplary illustration of a robot 202 calibrating front depth camera 124 based on or using sensor targets 102 and 104. Data from front depth camera 124 may comprise distance and position measurements of sensor targets 102 and 104 that are bounded by field of view 130, or alternatively referred to as a path or plane. An operator (not shown) may utilize a user interface, further illustrated in FIGS. 7A-C, to perform a calibration on the front depth camera 124 as well as a plurality of other sensors as illustrated in FIG. 1C. As illustrated in FIGS. 1A-B, the standoff target 102 surround the pyramid target 104 and are positioned in a square type configuration around the pyramid target 104. Each one of the plurality of standoff targets 102 may be equidistant from the pyramid target 104.

FIG. 1C is an illustration of a plurality of sensors and their corresponding fields of view that aid in calibrating the plurality of sensors according to an exemplary embodiment. The plurality of sensors positioned on robot 202 comprise at least a front depth camera 124, a slanted LIDAR 122, planar LIDAR 126, and two side depth cameras 128-L (left) and 128-R (right) with respective frustum or fields of view 124-1, 122-1, 126-1, and 128-1 as illustrated. Each sensor of the plurality of sensors collects data comprising the position, orientation, and/or distance reading of at least one corresponding or respective sensor target. For example, as illustrated, front depth camera 124 may collect distance and positional measurements of sensor targets 102 and 104 that are within field of view 124-1 of the front depth camera 124, Slanted LIDAR 122 may collect data from sensor targets 108 and 106 within field of view 122-1, Side depth camera 128-R may collect data from sensor target 112 on the right side of the robot, and side depth camera 128-L may collect data from a sensor target 112 on the left side of the robot 202 (located behind robot 202, not shown in FIG. 1C). Lastly, as illustrated, planar LIDAR 126 may collect data from sensor targets 106 and 110 within field of view 126-1. Data collected by each individual sensor may be used to calibrate the corresponding sensor using methods further illustrated in the figures below. Stated differently, each respective sensor has its respective field of view that intersects or is aligned with a respective sensor target. The respective sensor is able to calibrate itself or be calibrated by an operator based on the measurements of the respective sensor target that is within the field of view of the respective sensor.

Next referring to FIG. 1D, a view of the plurality of sensors used on the robot 202 in the calibration environment 100 is illustrated according to an exemplary embodiment. For case of understanding and purposes of clarity, robot 202 is omitted from FIG. 1D while the plurality of sensors are illustrated in order to get a clear perspective and understanding of the respective fields of views of each one of the plurality of sensors. The plurality of sensors include slanted LIDAR 122: front depth camera 124: planar LIDAR 126: and two side depth cameras 128 (left and right side) on each side that include right depth camera 128-R and left depth camera 128-L, of a device such as a robot. Additionally, as illustrated in FIG. 1D, fixed point or frame 116 may comprise front wheel chock 120 and rear wheel chocks 118 used to secure a robot 202 in fixed position within the frame 116. One skilled in the art would appreciate that FIGS. 1D and 1E do not show the device (i.e., robot) on which the plurality of sensors are placed or positioned thereon. The device (i.e., robot) is omitted from these illustrations for purposes of a clearer view of the plurality of sensors. Projections or fields of view of each of these plurality of sensors covers a certain region that is specific to where on the robot 202 the respective sensor is placed, as illustrated in FIG. 1D. As illustrated in FIG. 1D, each respective sensor of the plurality of sensors coupled or affixed to the robot include a field of view that includes at least one or more sensor targets.

Figure 1E:
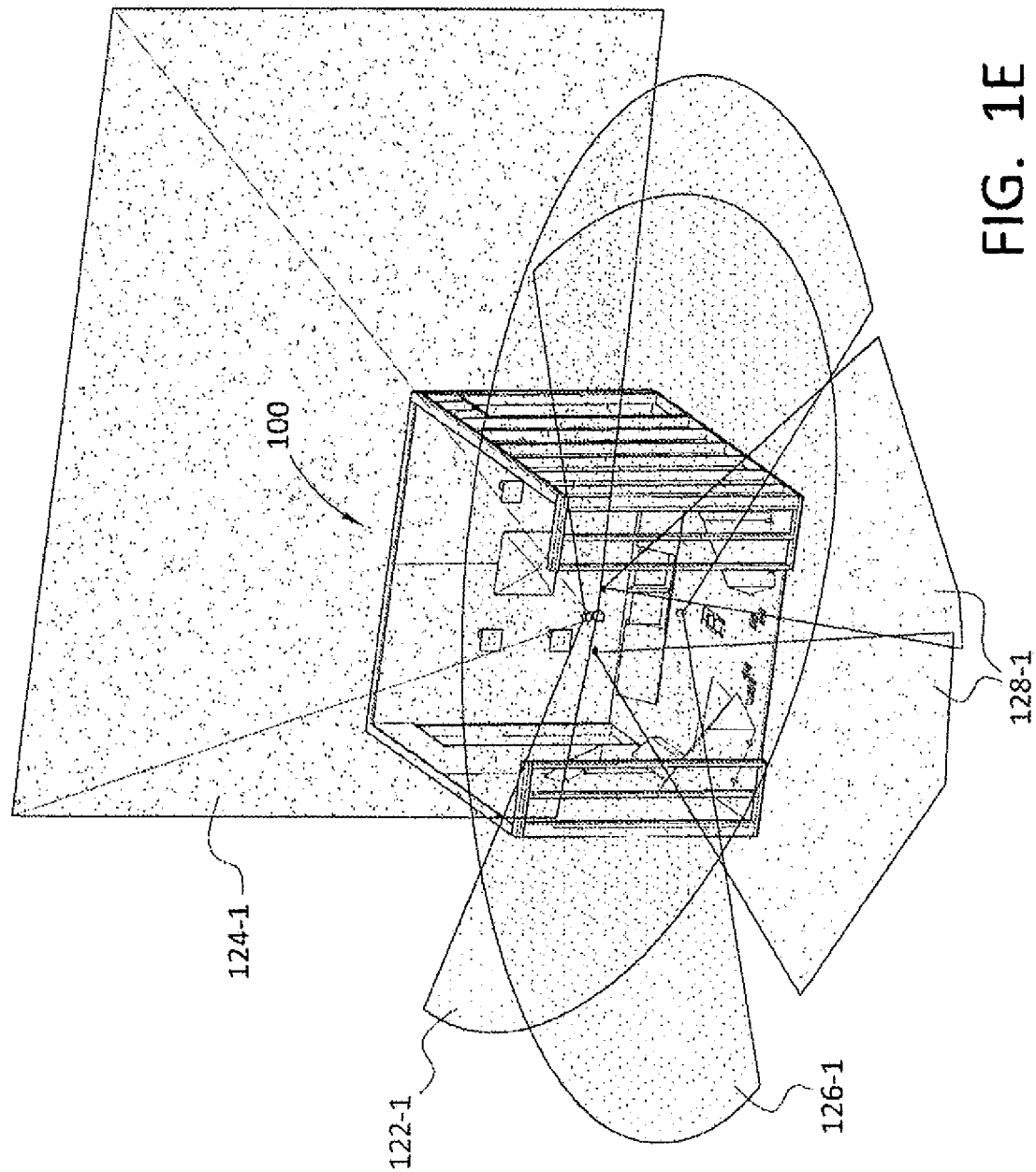
FIG. 1E is another view of the various fields of view projected by the various sensors shown in FIG. 1D according to an exemplary embodiment.

Next, referring to FIG. 1E the slanted LIDAR 122 collects data from targets along planar field of view 122-1. The targets along planar field of view 122-1 include, for example, sensor targets 106, 108. The front depth camera 124 collects data from targets along field of view 124-1. The targets along field of view 124-1 include, for example, sensor targets 102, 104. The planar LIDAR 126 collects data from sensor targets along planar field of view 126-1. The sensor targets along planar field of view 126-1 includes, for example, sensor targets 106, 110. And, lastly, the side depth cameras 128-R, 128-L collect data from sensor targets along their respective field of view 128-1. Field of view 128-1 being commonly annotated for fields of view for both right and left depth cameras. 128-R, 128-L. The sensor targets along field of view 128-1 include, for example, sensor targets 110, 112. Accordingly, based on these specific field of views for each respective sensor, data from a specific target is achieved. With respect to the CAD model as discussed above and in detail below with respect to FIG. 4, it is representative of data corresponding to respective fields of view 122-1, 124-1, 126-1 and 128-1. One skilled in the art would appreciate that the respective fields of views illustrated in FIGS. 1C, 1D and 1E, or alternatively referred to as paths or planes, may include overlapping portions or segments with respect to each other.

Figure 2A:
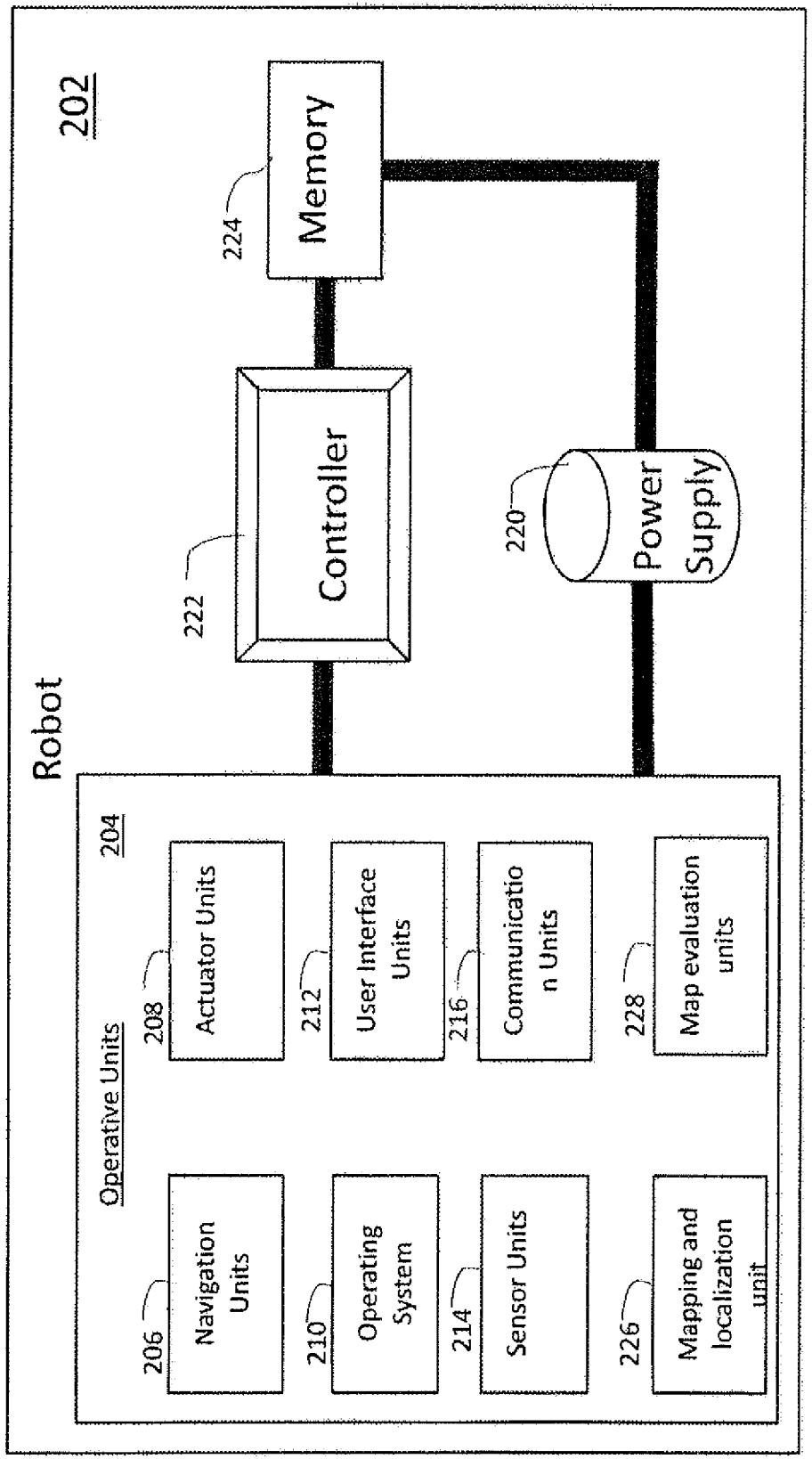
FIG. 2A is a functional block diagram of a robot in accordance with some implementations of this disclosure.

FIG. 2A is a functional block diagram of a robot 202 in accordance with an exemplary embodiment. As illustrated in FIG. 2A, robot 202 may include controller 222, memory 224, user interface unit 212, mapping and localization unit 218, sensor units 214, actuator unit 208, and communications unit 216, as well as other components and subcomponents (e.g., some of which may not be illustrated). Although a specific implementation is illustrated in FIG. 2A, it is appreciated that the architecture may be varied in certain implementations as would be readily apparent to one of ordinary skill given the contents of the present disclosure. As used herein, robot 202 may be representative at least in part of any robot described in this disclosure.

Controller 222 may control the various operations performed by robot 202. Controller 222 may include and/or comprise one or more processors (e.g., microprocessors) and other peripherals. As used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs"), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 222 may be operatively and/or communicatively coupled to memory 224. Memory 224 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"). Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 224 may provide instructions and data to controller 222, For example, memory 224 may be a non-transitory, computer-readable storage apparatus and/or medium having a plurality of instructions stored thereon, the instructions being executable by a processing apparatus (e.g., controller 222) to operate robot 202. In some cases, the instructions may be configured to, when executed by the processing apparatus, cause the processing apparatus to perform the various methods, features, and/or functionality described in this disclosure. Accordingly, controller 222 may perform logical and/or arithmetic operations based on program instructions stored within memory 224. In some cases, the instructions and/or data of memory 224 may be stored in a combination of hardware, some located locally within robot 202, and some located remote from robot 202 (e.g., in a cloud, server, network, etc.).

It should be readily apparent to one of ordinary skill in the art that a processor may be external to robot 202 and be communicatively coupled to controller 222 of robot 202 utilizing communication units 216 wherein the external processor may receive data from robot 202, process the data, and transmit computer-readable instructions back to controller 222. In at least one non-limiting exemplary embodiment, the processor may be on a remote server (not shown).

In some exemplary embodiments, memory 224, as shown in FIG. 2A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensors unit 214 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 202 operates, the complexity of objects and/or people, the variability in appearance of objects, physical properties of robots, the characteristics of the sensors, and/or the amount of available storage space (e.g., in the library, memory 224, and/or local or remote storage). In exemplary embodiments, at least a portion of the library may be stored on a network (e.g., cloud, server, distributed network, etc.) and/or may not be stored completely within memory 214. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

In exemplary embodiments, power supply 226 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 226 may also be any supplier of energy, including wall sockets and electronic devices that convert solar, wind, water, nuclear, hydrogen, gasoline, natural gas, fossil fuels, mechanical energy, steam, and/or any power source into electricity Still referring to FIG. 2A, operative units 204 may be coupled to controller 222, or any other controller, to perform the various operations described in this disclosure. One, more, or none of the modules in operative units 204 may be included in some embodiments. Throughout this disclosure, reference may be to various controllers and/or processors. In some embodiments, a single controller (e.g., controller 222) may serve as the various controllers and/or processors described. In other embodiments different controllers and/or processors may be used, such as controllers and/or processors used particularly for one or more operative units 204. Controller 222 may send and/or receive signals, such as power signals, status signals, data signals, electrical signals, and/or any other desirable signals, including discrete and analog signals to operative units 204. Controller 222 may coordinate and/or manage operative units 204, and/or set timings (e.g., synchronously or asynchronously), turn off/on control power budgets, receive/send network instructions and/or updates, update firmware, send interrogatory signals, receive and/or send statuses, and/or perform any operations for running features of robot 202.

Returning to FIG. 2A, operative units 204 may include various units that perform functions for robot 202. For example, operative units 204 includes at least navigation units 206, actuator units 208, user interface units 212, sensor units 214, and communication units 216. Operative units 204 may also comprise other units that provide the various functionality of robot 202. In exemplary embodiments, operative units 204 may be instantiated in software, hardware, or both software and hardware. For example, in some cases, units of operative unit 204 may comprise computer implemented instructions executed by a controller. In exemplary embodiments, units of operative unit 204 may comprise hardcoded logic. In exemplary embodiments, units of operative units 204 may comprise both computer-implemented instructions executed by a controller and hardcoded logic. Where operative units 204 are implemented in part in software, operative units 204 may include units/modules of code configured to provide one or more functionalities.

In exemplary embodiments, navigation units 206 may include systems and methods that may computationally construct and update a map of an environment, localize robot 202 (e.g., find the position) on a map, and navigate robot 202 to/from destinations. The mapping may be performed by imposing data obtained in part by sensor units 214 into a computer-readable map representative at least in part of the environment. In exemplary embodiments, a map of an environment may be uploaded to robot 202 through user interface units 212, uploaded wirelessly or through wired connection, or taught to robot 202 by a user.

In exemplary embodiments, navigation units 206 may further comprise a mapping and localization unit 218 which may receive sensor data from sensors units 214 to localize robot 202 on a map. In exemplary embodiments, mapping and localization units may include localization systems and methods that allow robot 202 to localize itself on the coordinates of a map and/or relative to a location (e.g., an initialization location, end location, beacon, reference point, etc.). Mapping and localization units may also process measurements taken by robot 202, such as by generating a graph and/or map. In some embodiments, mapping and localization unit 218 may not be a separate unit, but rather a portion of sensors unit 214 and/or controller 222.

In some embodiments, navigation units 206 may further comprise a map evaluation unit 220, which may analyze and evaluate a map or route to detect errors (e.g., map errors, map resolution, discontinuous routes, etc.), and/or the usability of a map or route. In exemplary embodiments, navigation units 206 determine a map to be unusable and/or contain errors causing robot 202 to prompt a user to re-demonstrate a route, or otherwise re-map the environment.

In exemplary embodiments, navigation units 206 may include components and/or software configured to provide directional instructions for robot 202 to navigate. Navigation units 206 may process maps, routes, and localization information generated by mapping and localization units, data from sensor units 214, and/or other operative units 204.

In exemplary embodiments, robot 202 may map and learn routes through a learning process. For example, an operator may teach robot 202 where to travel in an environment by driving robot 202 along a route in an environment. Through a combination of sensor data from sensor units 214, robot 202 may determine robot 202's relative poses and the poses of items in the environment. In this way, robot 202 may determine where it is in an environment and where it has travelled. Robot 202 may later recall where it travelled and travel in a substantially similar way (though it may avoid certain obstacles in subsequent travels). In some embodiments, robots may share such experiences with each other wirelessly, utilizing communication units 216.

Still referring to FIG. 2A, actuator units 208 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 202 to navigate a route: navigate around obstacles: rotate cameras and sensors.

According to exemplary embodiments, sensor units 214 may comprise systems and/or methods that may detect characteristics within and/or around robot 202. Sensor units 214 may comprise a plurality and/or a combination of sensors. Sensor units 214 may include sensors that are internal to robot 202 or external, and/or have components that are partially internal and/or partially external. In some cases, sensor units 214 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to exemplary embodiments, sensor units 214 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 214 may generate data based at least in part on measurements. Such data may be stored in data structures, such as matrices, arrays, queues, lists, arrays, stacks, bags, etc. According to exemplary embodiments, the data structure of the sensor data may be called an image.

According to exemplary embodiments, sensor units 214 may include sensors that may measure internal characteristics of robot 202. For example, sensor units 214 may measure temperature, power levels, statuses, and/or any characteristic of robot 202. In some cases, sensor units 214 may be configured to determine the odometry of robot 202. For example, sensor units 214 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 202. This odometry may include position of robot 202 (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

Mapping and localization unit 218 may receive sensor data from sensor units 214 to localize robot 202 in a map. According to exemplary embodiments, mapping and localization unit 218 may include localization systems and methods that allow robot 202 to localize itself in the coordinates of a map and/or relative to a location (e.g., an initialization location, end location, beacon, reference point, etc.). Mapping and localization unit 218 may also process measurements taken by robot 202, such as by generating a graph and/or map. According to exemplary embodiments, mapping and localization unit 218 may not be a separate unit, but rather a portion of sensor units 214 and/or controller 222.

According to exemplary embodiments, robot 202 may map and learn routes through a learning process. For example, an operator may teach robot 202 where to travel in an environment by driving robot 202 along a route in an environment. Through a combination of sensor data from sensor units 214, robot 202 may determine robot 202's relative poses and the poses of items in the environment. In this way, robot 202 may determine where it is in an environment and where it has travelled. Robot 202 may later recall where it travelled and travel in a substantially similar way (though it may avoid certain obstacles in subsequent travels). Robots may share such experiences with each other, such as through a network.

According to exemplary embodiments, user interface unit 212 may be configured to enable a user to interact with robot 202. For example, user interface unit 212 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCM-CIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 212 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface unit 212 may be positioned on the body of robot 202. According to exemplary embodiments, user interface unit 212 may be positioned away from the body of robot 202 but may be communicatively coupled to robot 202 (e.g., via communication units including transmitters, receivers, and/or transceivers) directly or indirectly (e.g., through a network, server, and/or a cloud). According to exemplary embodiments, user interface unit 212 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 216 may include one or more receivers, transmitters, and/or transceivers. Communications unit 216 may be configured to send/receive a transmission protocol, such as BLUETOOTH®, ZIGBEER, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrow band/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces may include any signal, data, or software interface with a component, network, or process including, without limitation, those of the Fire Wire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 216 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 216 to communicate to external systems, such as computers, smart phones, tablets, data capture systems, mobile telecommunications networks, clouds, servers, or the like. Communications unit 216 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 216 may be configured to send and receive statuses, commands, and other data/information. For example, communications unit 216 may communicate with a user operator to allow the user to control robot 202. Communications unit 216 may communicate with a server/network (e.g., a network) in order to allow robot 202 to send data, statuses, commands, and other communications to the server. The server may also be communicatively coupled to computer(s) and/or device(s) that may be used to monitor and/or control robot 202 remotely. Communications unit 216 may also receive updates (e.g., firmware or data updates), data, statuses, commands, and other communications from a server for robot 202.

Actuator unit 208 may include any system used for actuating, in some cases to perform tasks. For example, actuator unit 208 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 208 may include systems that allow movement of robot 202, such as motorized propulsion. For example, motorized propulsion may move robot 202 in a forward or backward direction, and/or be used at least in part in turning robot 202 (e.g., left, right, and/or any other direction). By way of illustration, actuator unit 208 may control if robot 202 is moving or is stopped and/or allow robot 202 to navigate from one location to another location.

One or more of the units described with respect to FIG. 2A (including memory 224, controller 222, sensor units 214, user interface unit 212, actuator unit 208, communications unit 216, mapping and localization unit 218, and/or other units) may be integrated onto robot 202, such as in an integrated system. However, according to exemplary embodiments, one or more of these units may be part of an attachable module. This module may be attached to an existing apparatus to automate so that it behaves as a robot. Accordingly, the features described in this disclosure with reference to robot 202 may be instantiated in a module that may be attached to an existing apparatus and/or integrated onto robot 202 in an integrated system. Moreover, in some cases, a person having ordinary skill in the art would appreciate from the contents of this disclosure that at least a portion of the features described in this disclosure may also be run remotely, such as in a cloud, network, and/or server.

One skilled in the art would appreciate that controller 222 may be alternatively referred to as a processor; wherein, the controller or the processor may correspond to a server at a remote location that is configured to operate the robot 202 by transmitting wireless signals thereto upon execution of specialized algorithms disclosed herein.

As used here on out, a controller (e.g., controller 222) performing a task or function includes the controller executing instructions from a non-transitory computer readable memory unit (e.g., memory 224) communicatively coupled to the controller. Similarly, a robot performing a task includes a controller executing instructions from a non-transitory computer readable memory unit and sending signals to a plurality of operative units effectuating their control. Additionally, it is appreciated by one of ordinary skill in the art that a controller or processor and memory units may be external to a robot and communicatively coupled via wired or wireless communication channels.

Figure 2B:
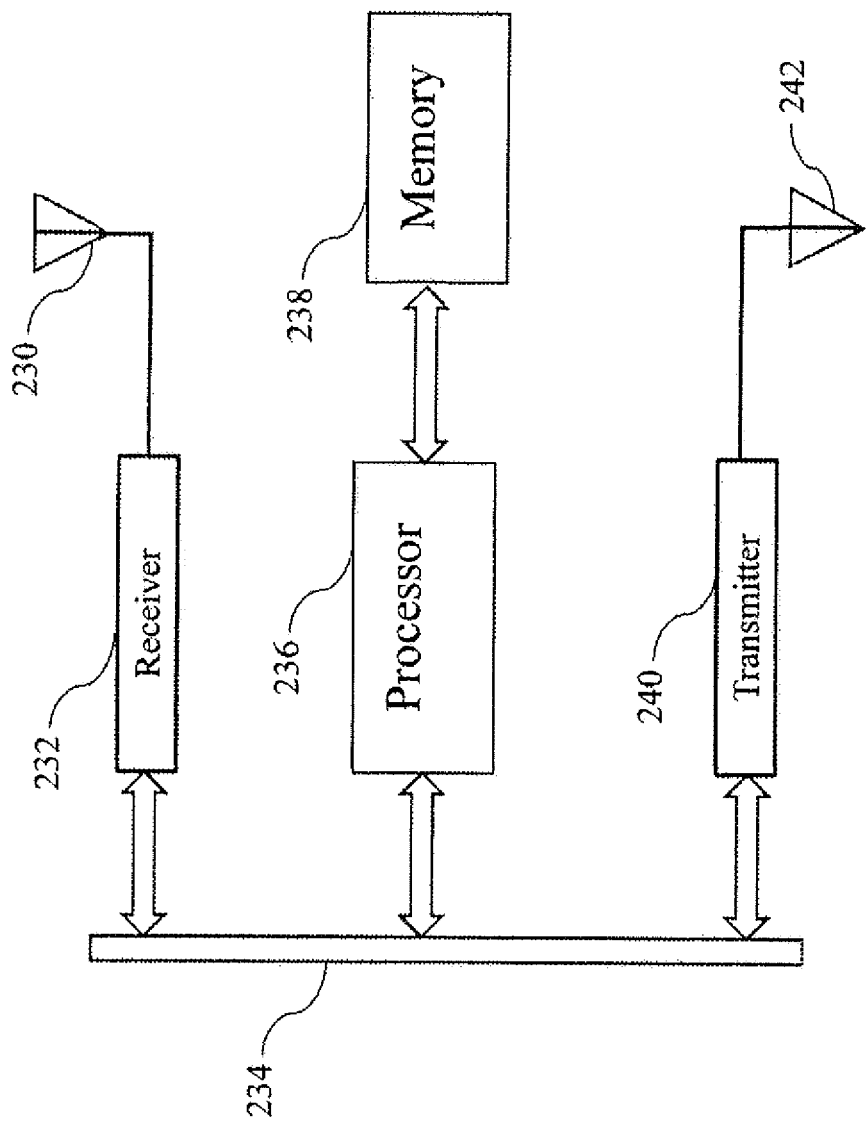
FIG. 2B is a functional block diagram of a controller illustrated in FIG. 2A according to an exemplary embodiment.

Next referring to FIG. 2B, the architecture of the specialized controller 222 used in the system shown in FIG. 2A is illustrated according to an exemplary embodiment. As illustrated in FIG. 2B, the specialized computer includes a data bus 234, a receiver 232, a transmitter 240, at least one processor 236, and a memory 238, The receiver 232, the processor 236 and the transmitter 240 all communicate with each other via the data bus 234. The processor 236 is a specialized processor configured to execute specialized algorithms as disclosed herein. The processor 236 is configured to access the memory 238, which stores computer code or instructions in order for the processor 236 to execute the specialized algorithms. As illustrated in FIG. 2B, memory 238 may comprise some, none, different, or all of the features of memory 224 previously illustrated in FIG. 2A. The algorithms executed by the processor 236 are discussed in further detail below. The receiver 232 as shown in FIG. 2B is configured to receive input signals 230 from at least navigation units 206, actuator units 208, user interface units 212, sensor units 214, communication units 216, mapping and localization units 218, and map evaluation units 220. The input signals 230 may comprise signals from a plurality of operative units 204 illustrated in FIG. 2A including, but not limited to, sensor data from sensor units 114, user inputs, motor feedback, external communication signals (e.g., from a remote server), and/or any other signal from an operative unit 204 requiring further processing by the specialized controller 222. The receiver 232 communicates these received signals to the processor 236 via the data bus 234. As one skilled in the art would appreciate, the data bus 234 is the means of communication between the different components—receiver, processor, and transmitter—in the specialized controller 222. The processor 236 executes the algorithms, as discussed below, by accessing specialized computer-readable instructions from the memory 238. Further detailed description as to the processor 236 executing the specialized algorithms in receiving, processing and transmitting of these signals is discussed above with respect to FIG. 2A. Thereafter, output signals 242 are transmitted via transmitter 240 based on the execution of the specialized algorithm by the processor 236. The output signals 242 are transmitted to at least navigation units 206, actuator units 208, user interface units 212, sensor units 214, communication units 216, mapping and localization units 218, and map evaluation units 220.

The memory 238 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 236 may communicate output signals to transmitter 240 via data bus 234 as illustrated. The transmitter 240 may be configured to further communicate the output signals to a plurality of operative units 204 illustrated by signal output 242.

One of ordinary skill in the art would appreciate that the architecture illustrated in FIG. 2B may alternatively illustrate a server configured to effectuate the control of a robotic apparatus from a remote or distant location. That is, the server may also include a data bus, a receiver, a transmitter, a processor, and a memory that stores specialized computer readable instructions thereon, such that the execution of the specialized algorithm as discussed above under FIGS. 2A and 2B is executed by a remote server that may or may not be in the same physical location as robot 202.

Figure 3A:
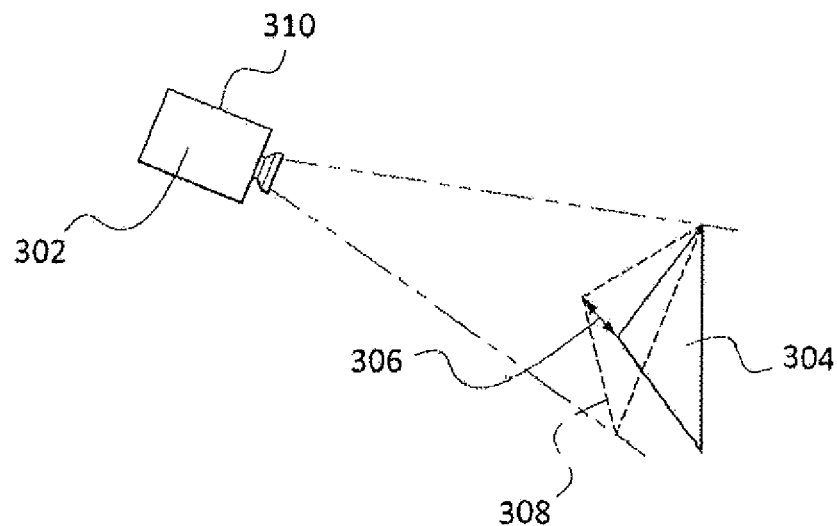
FIG. 3A is an illustration of a sensor perceiving a reference point in the calibration environment as shown in FIG. 1 with corrected position according to an exemplary embodiment.

FIG. 3A is an illustration of a sensor 302, of sensor units 214, illustrated in FIG. 2A. The sensor 302 is positioned at location 310 according to an exemplary embodiment. The sensor 302 may be for example the front depth camera 124, planar LIDAR 126, slanted LIDAR 122, and rear depth cameras 128 (left and right) that receive data of the perceived position of a sensor target 304. The sensor target 304 may be for example sensor targets 102, 104, 106, 108, 110, and/or 112 shown in FIG. 1. The data received corresponding to location of the planar LIDAR 126 may be represented as, for example, as $X_1'$, $Y_1'$, $Z_1'$, $Yaw_1'$, $Pitch_1'$ and $Roll_1'$ as shown in table 400 of FIG. 4; and for slanted LIDAR 122 the data received may be represented as, for example, $X_2'$, $Y_2'$, $Z_2'$, $Yaw_2'$, $Pitch_2'$ and $Roll_2'$, as shown in FIG. 4, so on and so forth. Upon comparing the sensor data received from the respective sensor with the ideal CAD model, as shown in block 512 of FIG. 5, further discussed below, the specialized controller 222 may determine that there is offset from the location of sensor target 304 by an error 306, as shown in block 512 in FIG. 5. In at least one non-limiting exemplary embodiment, error 306 may comprise data gathered by sensor units 214 further comprising differences in position, pitch, roll, and/or yaw of sensor target 304 stored in memory 224 by controller 222. According to at least one non-limiting exemplary embodiment, controller 222 processes error 306 and location of the sensor target 304 in an ideal CAD to generate a transformation matrix to be applied to a sensor data matrix to calibrate the sensor. In another non-limiting exemplary embodiment, sensor target 304 may comprise, but is not limited to, any type of sensor targets 102, 104, 106, 108, 110, or 112 illustrated in FIG. 1A.

Figure 3B:
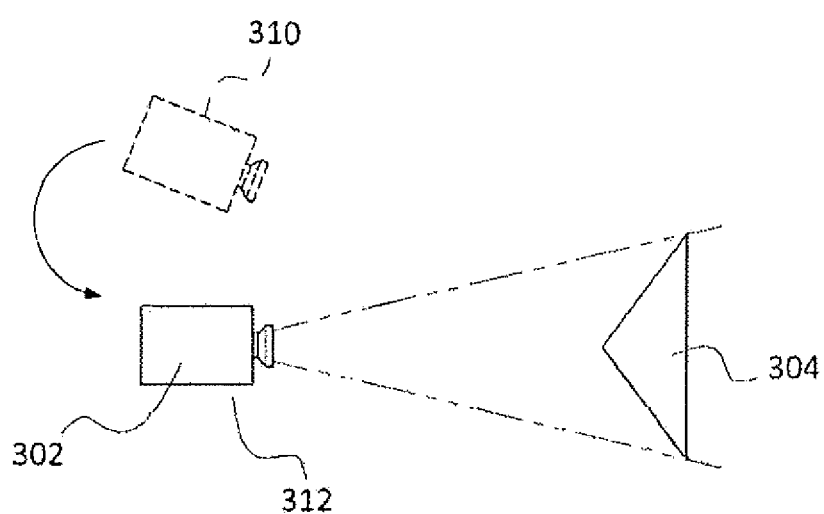
FIG. 3B is another illustration of the sensor shown in FIG. 3A perceiving the reference point shown in FIG. 1 according to an exemplary embodiment.

Next referring to FIG. 3B, a transformation matrix applied to sensor 302 by the controller 222 is illustrated according to an exemplary embodiment. That is, position of the sensor 302 is changed from a first location to a different location in order to correct the error 306 shown in FIG. 3A. The correcting of the error 306 by the controller 222 causes the sensor 302 to perceive target 304 in its correct position. Position 312 of the sensor 302 is calculated by controller 222 by executing instructions stored in memory 224 which will compare the sensor data to the ideal CAD model of the environment. In turn, as discussed in further detail below, the sensor data location shown in FIG. 4, which is data obtained by the respective sensor, is compared by the CAD model and upon finding discrepancy or error between the two, the sensor data location is matched to the CAD model.

In at least one non-limiting exemplary embodiment, controller 222 may execute instructions stored in memory 224 to virtually adjust sensor location 310 by applying a transformation matrix, comprising transformations to sensor data, calculated from error 306 by controller 222, to adjust the perception of objects by the sensor to align with the ideal CAD model. In another non-limiting exemplary embodiment, this data may comprise transformations to coordinate positions, pitch, yaw, and/or roll of data of the respective sensor (i.e., front depth camera 124, slanted LIDAR 122, planar LIDAR 126, and rear depth cameras 128) to align the perceived position of sensor target 306 with the ideal CAD model location 308. In another non-limiting exemplary embodiment, positions 310 and 312 may occupy the same physical space wherein position 312 may be representative of a virtual adjustment of sensor 302.

In another non-limiting exemplary embodiment, controller 222 may execute instructions stored in memory 224 causing one or more actuator units 208 to adjust sensor unit 302 to a different position 312 shown in FIG. 3B. This adjustment may comprise rotation, lateral, horizontal, and/or vertical adjustment of the respective sensor 302.

In another non-limiting exemplary embodiment, controller 222 may execute instructions stored in memory 224 causing a user interface unit 212 to display instructions to an operator comprising instructions for manual adjustment of a sensor if no virtual transformation or actuator may reduce error 306.

Next referring to FIG. 4 an example of a data table 400 is illustrated according to an exemplary embodiment. FIG. 4 is an exemplary embodiment of data collected by an individual sensor unit of sensor units 214. These sensor units may include, for example, as illustrated in FIG. 1, a planar LIDAR 126, a slanted LIDAR 122, a front depth camera 124, right depth camera 128-R, and left depth camera 128-L. One skilled in the art would appreciate that additional sensors may be included on the robot 202. The data collected by these respective sensors may comprise a set of coordinate values (i.e., x-axis, y-axis, and z-axis), pitch angle, yaw angle, and roll angle of each sensor target seen by each respective sensor. Controller 222 then stores the data generated in table 400 in memory 224 for later use in calibrating the sensor.

One skilled in the art would appreciate that data table 400 shown in FIG. 4 is a self-referential table that may have additional rows and columns as controller 222 executes computer readable instructions. As a preliminary step, the data table 400 may only consist of the rows and columns that include the respective sensors illustrated in FIG. 4 and the respective CAD model inputs. In other words, data table would be limited to data in a 5×6 matrix, for example, which includes five (5) rows consisting of front depth camera 124, slanted LIDAR 122, planar LIDAR 126, right depth camera 128-R, and left depth camera 128-L, and six (6) columns consisting of x-axis, y-axis, z-axis, pitch angle, roll angle and the yaw angle. Thereafter, upon introducing the robot 202 to the calibration room 100 shown in FIG. 1, and turning on the respective sensors, the data received by the respective sensors may expand or extrapolate the data table 400 to six (6) additional columns, which include the data obtained from the respective sensors; and potentially more rows for addition of any additional sensors to the robot 202. For example, for the $n^{th}$ sensor, a $n^{th}$ data row may be added to the data table 400. Accordingly, one skilled in the art that the data table 400 stored in memory 224, for example, may be modified or extrapolated, by addition of rows and columns, based on the data collected by the respective sensors.

Upon receiving data from the respective sensors as shown in FIG. 4, controller 222, shown in FIG. 2A, is configured to execute the computer readable instructions to compare and match the received data with data of the CAD model. The comparison of the respective sensor data and the respective CAD model data is done on a coordinate by coordinate basis. For example, sensor data location $X_1'$ received by planar LIDAR 126 is compared with $X_1$ of the CAD model of the planar LIDAR 126; the sensor data location $Pitch_1'$ received by planar LIDAR 126 is compared with $Pitch_1$ of the CAD model of the planar LIDAR 126; so on and so forth. In other words, a one to one comparison of each coordinate or data entry of the respective sensor is performed to determine whether there is a match between the sensor data and the CAD model data. If there is no match, but an error 306 is determined as shown in FIG. 3A, then controller 222 is configured to execute computer readable instructions to transmit new coordinates to the respective sensor which match the CAD model data points. In other words, if value of $X_1'$ of a respective sensor is different than the $X_1$ of the CAD model, then new coordinates corresponding to the CAD model are transmitted to the respective sensor, thereby effectuating movement of the respective sensor by a desired distance or along a certain axis (i.e., pitch, roll, yaw), as shown in FIG. 3B.

The new coordinates transmitted to the respective sensor in order to calibrate the respective sensor correspond to the CAD model data such that the change effectuated in the position of the sensor corresponds to the difference in value of the coordinates perceived by the respective sensor and the coordinates of the CAD model data. For example, if respective sensor has a value of $X_1'$, $Yaw_1'$, $Roll_1'$ which are different by delta ($\Delta$) compared to the respective corresponding CAD data, then such delta ($\Delta$) value is adjusted for the respective sensor. The foregoing is a non-limiting example for planar lidar 124, wherein one skilled in the art would appreciate that similar concept may be applied to the other sensors—slanted LIDAR 122, planar LIDAR 126 and left depth camera 128-L, according to the exemplary embodiment illustrated in FIG. 4.

In at least one non-limiting exemplary embodiment, the data of table 400 may comprise of some, none, more, or all the data types in table 400 (e.g., color of target, size of target, etc.). In at least one non-limiting exemplary embodiment, sensor units 214 may comprise of some, none, different, and/or additional types of sensor units illustrated in table 400.

In another non-limiting exemplary embodiment, one sensor may collect data from a plurality of targets wherein controller 222 stores additional data in memory 224 comprising the perceived and ideal CAD locations of the sensor targets. Similarly, in another non-limiting exemplary embodiment, a plurality of sensors may collect data from one sensor target wherein controller 222 stores additional data in memory 224 comprising the additional perceived and ideal CAD location of the sensor target.

Figure 5:
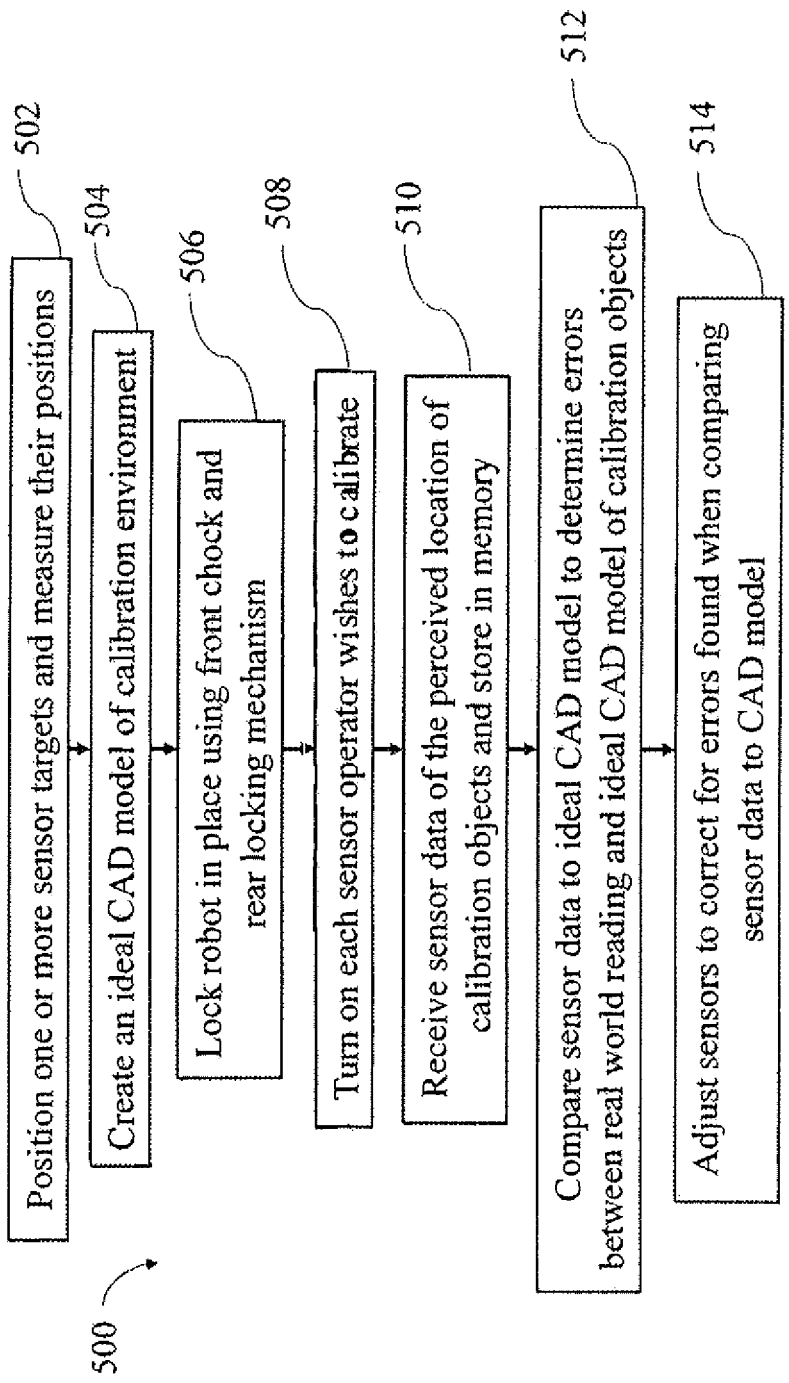
FIG. 5 is a process flow diagram of a method for operating a calibration room to calibrate a robot by a specialized processor according to an exemplary embodiment.

FIG. 5 is a process flow diagram, with reference to FIGS. 1A-E and 2A, of process 500 for an operator desiring to calibrate at least one sensor of sensor units 214 on a robot 202 utilizing the systems and methods of the present disclosure according to an exemplary embodiment. Block 502 illustrates an operator positioning one or more sensor targets 102, 104, 106, 108, 110, and/or 112 at fixed locations as shown in FIG. 1 and measuring their position within the calibration environment.

Block 504 illustrates an operator, using the measurements found in block 502, to create an ideal CAD model of the calibration environment 100, previously illustrated in FIGS. 1A-E. According to at least one non-limiting exemplary embodiment, the ideal CAD model of the calibration environment 100 may be created by a separate specialized processing apparatus for later processing by robot 202. The ideal CAD model may comprise a data structure or set of values corresponding to ideal measurements by sensors of a robot 202 of the sensor targets with the sensors being at respective default (i.e., perfectly calibrated) poses.

Block 506 illustrates robot 202 being locked into position 116 by utilizing front wheel chock 120, rear wheel chocks 118, and/or rear latching device 114, as shown in FIGS. 1A and 1D, to ensure robot 202 is in a fixed location and to ensure position 116 stays fixed for additional robots to be calibrated using the same environment according to an exemplary embodiment. Any mechanism may be utilized to secure robot 202 in a fixed, known location within the calibration environment 100, wherein use of a front and rear wheel chocks are not intended to be limiting.

Block 508 illustrates an operator utilizing user interface units 212, shown in FIG. 2A, to send a signal to controller 222. The controller 222 upon receipt of the signal will execute instructions stored in the memory 224 to gather data from sensor units 214 of the surrounding environment 100 and thereafter store the data in memory 224. According to at least one non-limiting exemplary embodiment, controller 222 may gather data from one, some, or all sensors specified by an operator through user interface units 212.

Block 510 illustrates sensor units 214 receiving data from the location and orientation of sensor targets 102, 104, 106, 108, 110, and/or 112. According to at least one non-limiting exemplary embodiment, this sensor data may comprise any one or more of lateral orientation, horizontal orientation, vertical orientation, pitch, yaw, and/or roll and may be stored in a matrix within memory 224.

Block 512 illustrates controller 222 executing instructions from memory 224 to compare gathered sensor data to the idealized CAD model of the environment 100 and determining errors. According to at least one non-limiting exemplary embodiment, these errors are stored in memory for later adjustment of sensor units 214 and may comprise differences between sensor data and ideal CAD model including, but not limited to, lateral orientation, horizontal orientation, vertical orientation, pitch, yaw, and/or roll of a sensor target. According to another non-limiting exemplary embodiment, a transformation matrix corresponding to a difference between a measured pose and an ideal pose of each sensor target may be stored in memory. For example, with reference to FIG. 3A-B, the transformation matrix may comprise a spatial transformation between location 310 and location 312 based on error 306. That is, any value representing a difference between the measured pose of the sensor targets and the ideal pose of the sensor targets denoted by the ideal CAD model may be stored in memory, wherein the value may be zero or nonzero.

Figure 10:
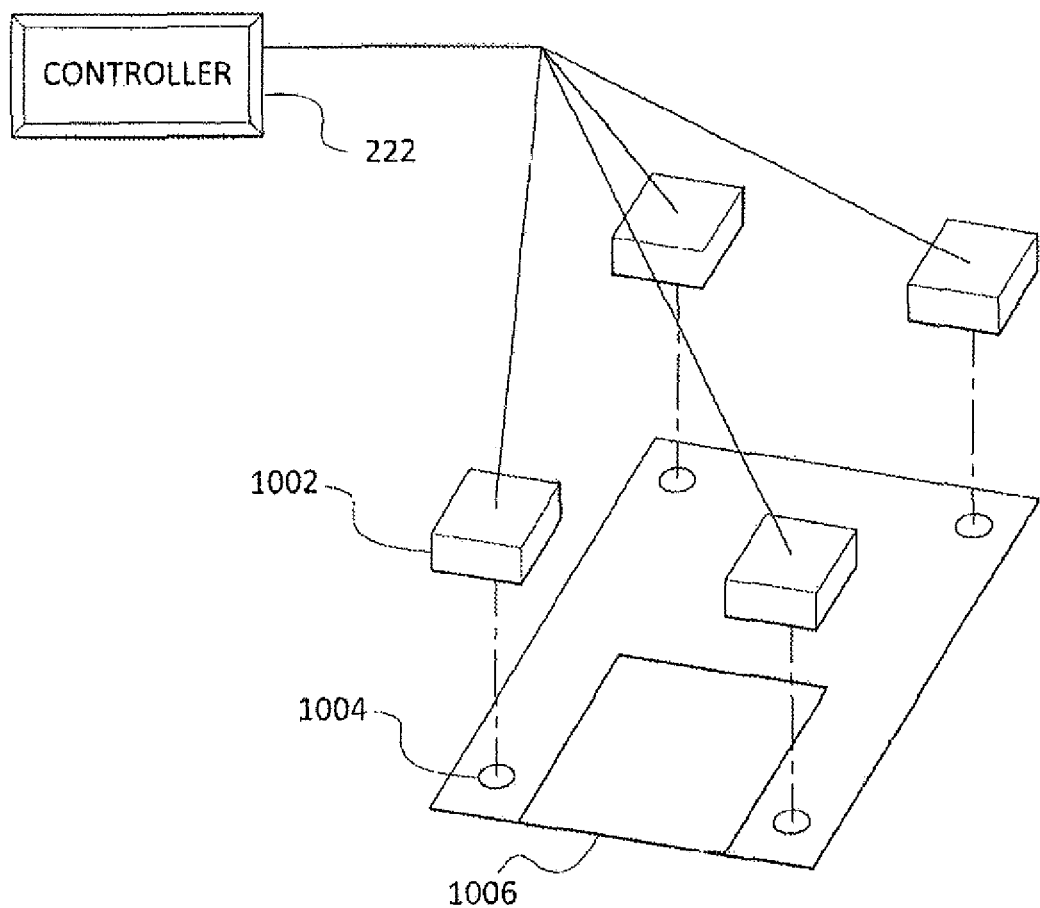
FIG. 10 illustrates an apparatus used to adjust a sensor based on a calibration measurement according to an exemplary embodiment.

Block 514 illustrates controller 222 executing instructions from memory 224 that, when executed, causes controller 222 to adjust sensors to minimize errors. According to at least one non-limiting exemplary embodiment, these sensors (e.g., front depth camera 124, slanted LIDAR 122, and rear depth cameras 128, etc.) may be adjusted by controller 222 executing code from memory 224 that may cause actuator units 208 to adjust the positioning of sensors, as illustrated in FIG. 10 below. According to another non-limiting exemplary embodiment, controller 222 executing instructions from memory 224 may create a transformation matrix based, at least in part, on error data found in block 510 and applying the transformation matrix to sensor data causing sensor units 214 to perceive the object correctly. According to another non-limiting exemplary embodiment, controller 222 may send a signal to a user interface, of user interface units 212, causing the user interface to display instructions for manual adjustment of a sensor based on the calculated errors.

Figure 6A:
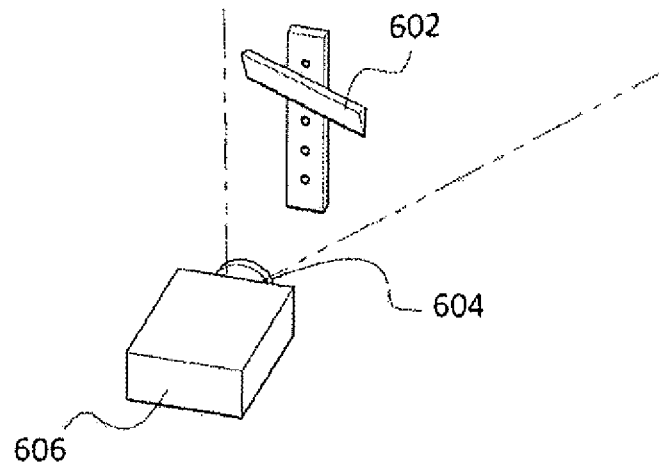
FIGS. 6A and 6B are illustrative examples of sensor targets being adjusted to meet the needs of different sensors and robots according to an exemplary embodiment.

FIG. 6A is an illustrative embodiment of the method of calibrating sensor 604 on robot 606 according to an exemplary embodiment. In referencing sensor 604, one skilled in the art would appreciate that such a sensor may be a front depth camera 124, slanted LIDAR 122, planar LIDAR 126, rear depth cameras 128, or any other similar sensor to be calibrated using methods of the present disclosure. Sensor 604, as shown in FIG. 6A, collects data from sensor target 602 for calibration of sensor 604 utilizing the systems and methods of the present disclosure. In referencing sensor target 602, one skilled in the art would appreciate that such sensor target 602 may correspond to targets 102, 104, 106, 108, 110, or 112 illustrated in FIG. 1. Sensor target 602 is positioned such that it may be seen by sensor 604. In at least one non-limiting exemplary embodiment, sensor target 602 may comprise any type of sensor targets 102, 104, 106, 108, 110, 112 illustrated in FIG. 1 or any other sensor target comprising material visible to sensor 604.

The sensor 604 may collect measurements of the target 602 which may be compared to ideal measurements of a CAD model of the target 602. For example, edges of the target 602 may be localized by the sensor 604, wherein the localization of the edges may be compared to an ideal CAD model of the target 602 such that an error (e.g., error 306) may be determined. The error may correspond to a discrepancy in a pose of the sensor 604 from a default pose.

Figure 6B:
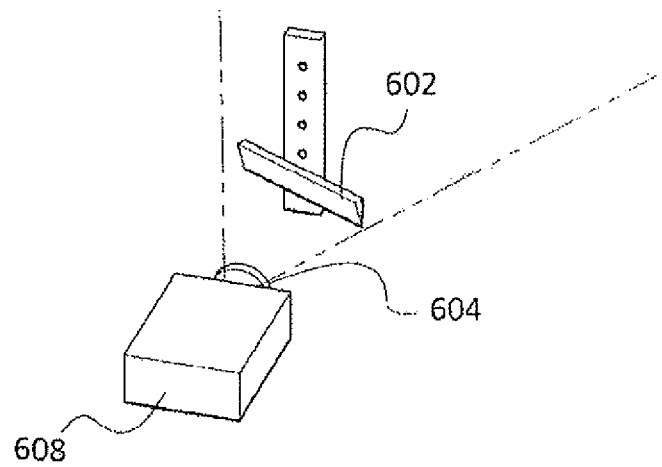

FIG. 6B is an illustrative embodiment of a method for calibrating sensor 604 on robot 608 according to an exemplary embodiment. Robot 606 may have different properties from robot 608 such as, but not limited to, size, location of sensor, number of sensors 604, etc. In at least one non-limiting exemplary embodiment, an operator may move sensor target 602 to allow for robot 608 to utilize sensor target 602 for calibration.

In another non-limiting exemplary embodiment, sensor target 602 may be positioned using screws, latches, Velcro®, magnets, a sliding mechanism, or any similar method to facilitate repositioning of sensor target 602 so that different robots 606 and 608 may be calibrated in the same room by repositioning sensor target 602. In another non-limiting exemplary embodiment, sensor target 602 may encompass one or multiple sensor targets and similarly sensor 604 may encompass one or many sensors of sensor units 214 illustrated in FIG. 2A. Additionally, after robot 606's sensor 604 has been calibrated, sensor target 602 may be exchanged for a different sensor target to facilitate the calibration of robot 608 if sensor target 602 cannot be used to calibrate sensor 604 of robot 608.

FIG. 7A is an illustration of a user interface on a device, of user interface units 212, according to an exemplary embodiment. According to at least one non-limiting exemplary embodiment, the user interface of FIG. 7A provides a user a system to run calibration tests on each individual sensor and/or a plurality of sensors 122, 124, 126, 128, as shown in FIG. 1B, either independently or concurrently, as well as additional sensors (not shown) simultaneously. That is, either a single sensor may be calibrated at a time or a plurality of sensors may be calibrated all at once at the same time. As shown in FIG. 7A, a table format is illustrated with the respective sensor listed in the left column and the status of the respective sensor listed in the right column. The status "Run" 702 listed in the right column indicates that the right depth camera 128-R (i.e., labeled as right depth), front depth camera 124 (i.e., labeled as front depth), slanted LIDAR 122 (i.e., labeled as top LIDAR) and planar LIDAR 126 (i.e., labeled as bottom LIDAR) are in the ready state to be calibrated.

FIG. 7B is an exemplary illustration of a user interface while controller 222, shown in FIG. 2A, is running calibration tests on a right depth sensor 128-R of sensor units 214 according to an exemplary embodiment. That is, only the right depth sensor 128-R is being calibrated in this non-limiting exemplary embodiment. This is evidenced by the annotation "Right Progress" 704 in FIG. 7B which is not shown in FIG. 7A.

According to at least some non-limiting exemplary embodiments, the user interface may comprise additional, fewer, or the same number of sensors which may comprise the same and/or different types of sensors as illustrated in FIGS. 7A and 7B.

Figure 7C:
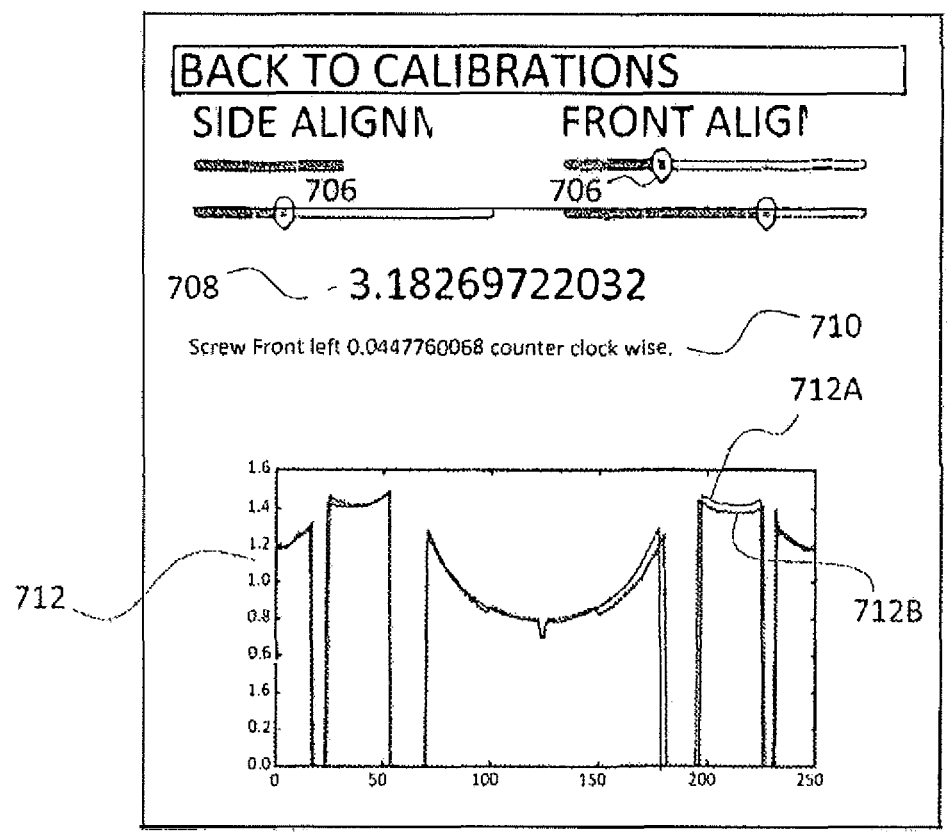

FIG. 7C is an exemplary illustration of a user interface, of user interface units 212, displaying calibration results from a sensor according to at least one exemplary embodiment. These results may comprise, but are not limited to, alignment visual indicators 706, a calibration score 708, operator instructions 710, and graphical sensor data 712. Visual alignment indicators 706 as illustrated provide an operator with a visual representation of the calibration results regarding the side and front alignment of the sensor. Calibration score 708 may be a representative numerical figure indicative of the accuracy of the sensor, wherein a low score may correspond to a well calibrated sensor and vice versa. The user interface may additionally display operator instructions 710 comprising further instructions for the operator to manually adjust the sensor based on calibration test results. Graphical sensor data 712, according to an exemplary embodiment, may further comprise a sensor reading 712A and CAD ideal reference reading 712B wherein an ideal reading would comprise graphs 712A and 712B to be indistinguishable. According to at least one non-limiting exemplary embodiment, controller 222 may determine, based on the calibration measurement, an adjustment to be made to the mounting of a sensor, further illustrated below in FIG. 10. According to at least one non-limiting exemplary embodiment, the user interface displaying calibration results may comprise some, none, or all of the results illustrated in FIG. 7C and may be displayed in a plurality of formats, not illustrated in FIG. 8, as would be appreciated by one of ordinary skill in the art.

Figure 8:
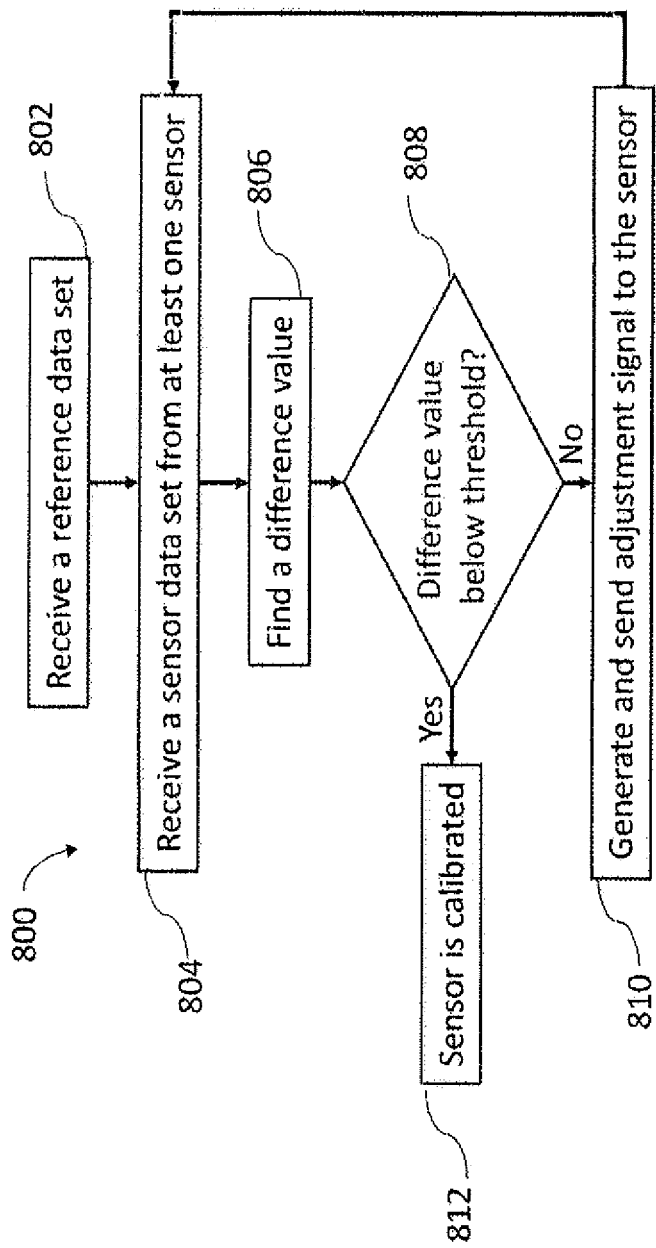
FIG. 8 is a process flow diagram of an exemplary method for a processor calibrating a sensor based on sensor data of the calibration environment according to an exemplary embodiment.

FIG. 8 is a process flow diagram illustrating a specialized controller 222, executing instructions stored in memory 224 with reference to FIG. 2A, calibrating and adjusting a sensor according to an exemplary embodiment. The sensor may comprise any sensor of sensor units 212 including, but not limited to, front depth camera 124, slanted LIDAR 122, planar LIDAR 126, or rear depth cameras 128. The sensor may be a sensor on a robot 202 positioned within a calibration environment 100.

Block 802 includes controller 222 receiving a set of reference data comprising an ideal sensor reading generated from a CAD model of the calibration environment 100. According to at least one non-limiting exemplary embodiment, the reference data may be received, via wired or wireless communication, from an external processor that generated the CAD model and reference data. According to another exemplary embodiment, the reference data may be calculated by controller 222 executing instructions stored in memory 224 without the use of an external processor. The reference data may be stored in memory 224 by controller 222 for later determination of a difference value in block 806.

Block 804 includes controller 222 receiving a set of sensor data from a calibration test and storing the data set in memory 224, as illustrated in FIG. 2A. The sensor data may comprise the data from a sensor of sensor units 214 and further comprise data representative of the detection of a sensor target at a corresponding orientation and position. The sensor data may be stored in memory 224 by controller 222 for later determination of the difference value in block 806. The calibration test may comprise the operator activating the sensor to measure at least one target.

Block 806 includes controller 222, executing instructions stored in memory 224 illustrated in FIG. 2A, calculating a difference value between the reference and sensor data sets. According to at least one non-limiting exemplary embodiment, the difference value may comprise one or many values such as, but not limited to, differences in positional coordinates (x, y, z), pitch, yaw, and/or roll. This difference value may be stored in memory 224 by controller 222 for later comparison to a threshold value illustrated in block 808.

Block 808 includes controller 222, executing instructions stored in memory 224 with reference to FIG. 2A, comparing the difference value found in block 806 to a set threshold, wherein a difference value below the set threshold corresponds to a calibrated sensor. The threshold may be set by an operator based on how accurately the operator desires to calibrate the sensors (e.g., lower threshold corresponds to more accurate calibration) and may further comprise thresholds for specific parameters (e.g., pitch, yaw, roll, and position parameters). For example, the threshold value may be zero, wherein a difference value of zero corresponds to no differences between the reference data set received in block 802 and the sensor data set received in block 804. Similarly, the threshold for individual parameters may differ from each other wherein, according to a non-limiting exemplary embodiment, the threshold for an accurate calibration for the pitch of a sensor target might be higher than the corresponding threshold for position in the case of calibrating a depth sensor. If the difference value is below the set threshold, controller 222 moves to block 812, whereas if the difference value is greater than zero (exceeding the threshold) controller 222 moves to block 810.

Block 810 includes controller 222, executing instructions stored in memory 224, generating and sending an adjustment signal to the sensor, the signal comprising adjustments to the sensor to minimize the difference value based, at least in part, on the difference value found in block 806. According to at least one non-limiting exemplary embodiment, the adjustment signal may comprise computer-readable instructions to virtually adjust the sensor by applying transformations to the sensor data. According to another non-limiting exemplary embodiment, this adjustment signal may comprise changes to the mounting of a sensor by activating an actuator, further illustrated below in FIG. 10. According to another non-limiting exemplary embodiment, the adjustment signal may be sent to a user interface and the signal may cause the user interface to display a set of instructions for manual adjustment of a sensor by the operator. According to at least one exemplary embodiment, the sensor may be calibrated a plurality of times after an adjustment signal is determined until the sensor reaches the operator's desired level of calibration (e.g., difference value falls below the threshold).

Block 812 includes a difference value, found in block 808, determined to be below the set threshold corresponding to a calibrated sensor and requiring no further action. It may be appreciated by one of ordinary skill in the art that the exemplary methods illustrated in FIG. 8 may be repeated to calibrate a plurality of sensors on a robot using substantially similar methods.

Block 902 illustrates an operator positioning at least one sensor target within the path of at least one corresponding sensor. The sensor targets may comprise any sensor targets 102, 104, 106, 108, 110, and/or 112 illustrated in FIGS. 1A-D and may be positioned anywhere in the calibration environment within the path of a corresponding sensor. The sensor targets may be held in position by screws, latches, Velcro®, hooks, magnets, and/or any other similar type of mounting a sensor target.

Block 904 illustrates the operator measuring the position and orientation of at least one sensor target within the calibration environment 100. These measurements may comprise any measurements useful in generating a CAD model of the calibration environment, later illustrated in block 908, such as at least one target's distance to the device, rotation relative to a fixed plane of reference, etc. According to another non-limiting exemplary embodiment, physical parameters of the target may additionally be measured by the operator such as, but not limited to, reflectiveness, color, shape, and/or any other physical parameter of a sensor target detectable by at least one sensor for later determination of a difference value, illustrated in FIG. 8. In some embodiments, an operator may position a sensor at a default pose (i.e., a well calibrated, ideal pose) and simply activate the sensor to measure parameters of the sensor target.

Block 906 illustrates an operator designating a fixed position within the calibration environment 100 where the device will be positioned during calibration. As illustrated in FIG. 1D, the designated fixed position may be fixed position 116 comprising rear wheel chock 118, front wheel chock 120 and a rear locking mechanism 114 to ensure the robot does not move during calibration. Additionally, as would be appreciated by one of ordinary skill in the art, the designation of a fixed point allows the operator to calibrate a plurality of identical devices accurately using a calibration environment 100 which, from the perspective of the plurality of identical robots 202 for example, is identical from device to device.

Block 908 illustrates the operator creating a CAD reference model of the calibration environment 100 using the measurements obtained in block 904 and the fixed point determined in block 906. According to at least one non-limiting exemplary embodiment, the operator may create the CAD model using a specialized processor, executing instructions from memory, separate from the device and may be communicated to the device, using communication units 216 illustrated in FIG. 2A, via wired or wireless communication. Similarly, according to another non-limiting exemplary embodiment, the CAD model may be created by a specialized processor on the device wherein the operator may input measurements from a user interface, of user interface units 212, to generate the CAD model. In some embodiments, the CAD model may comprise a data structure or set of values corresponding to measurements by the at least one sensor at the respective default poses.

Block 910 illustrates the operator activating at least one sensor by giving input to a user interface, illustrated in FIG. 7A, corresponding to at least one sensor the operator desires to calibrate. The device collects and stores the sensor data for later determination of a difference value used for calibrating at least one sensor as illustrated in FIG. 8.

Figure 9A:
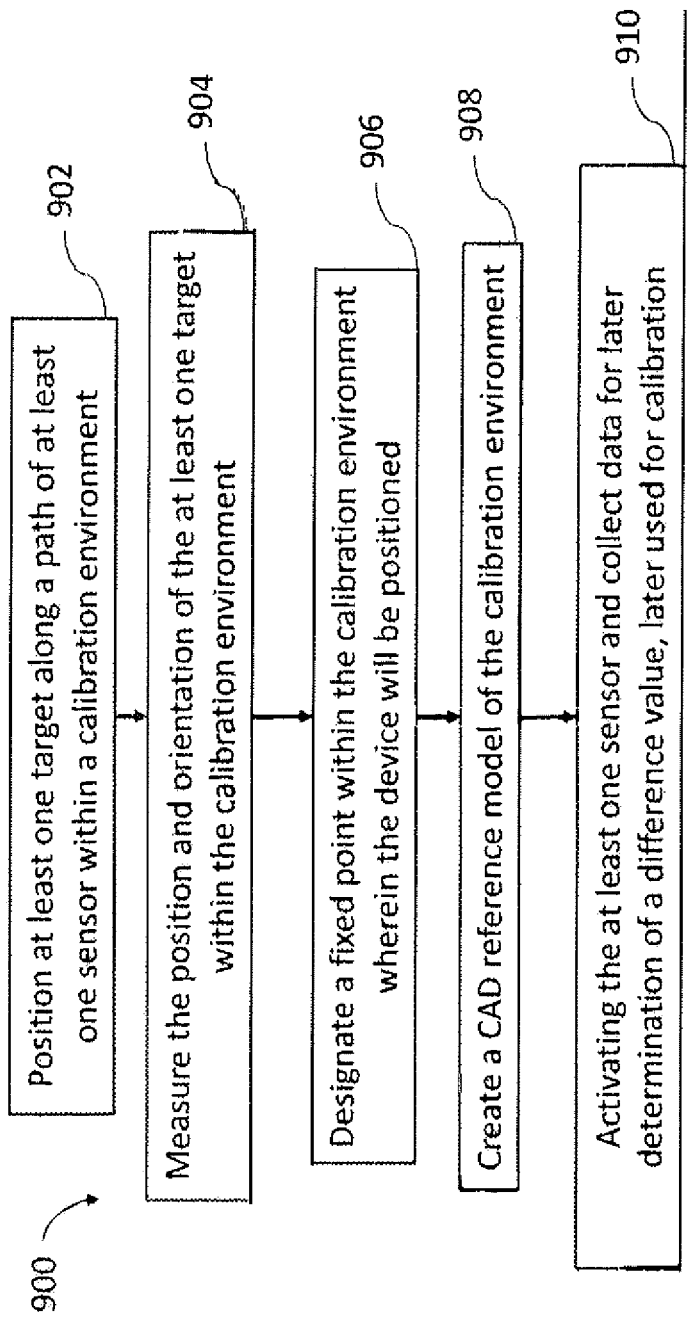
FIG. 9A is a process flow diagram of an exemplary method for an operator to operate a calibration environment.
Figure 9B:
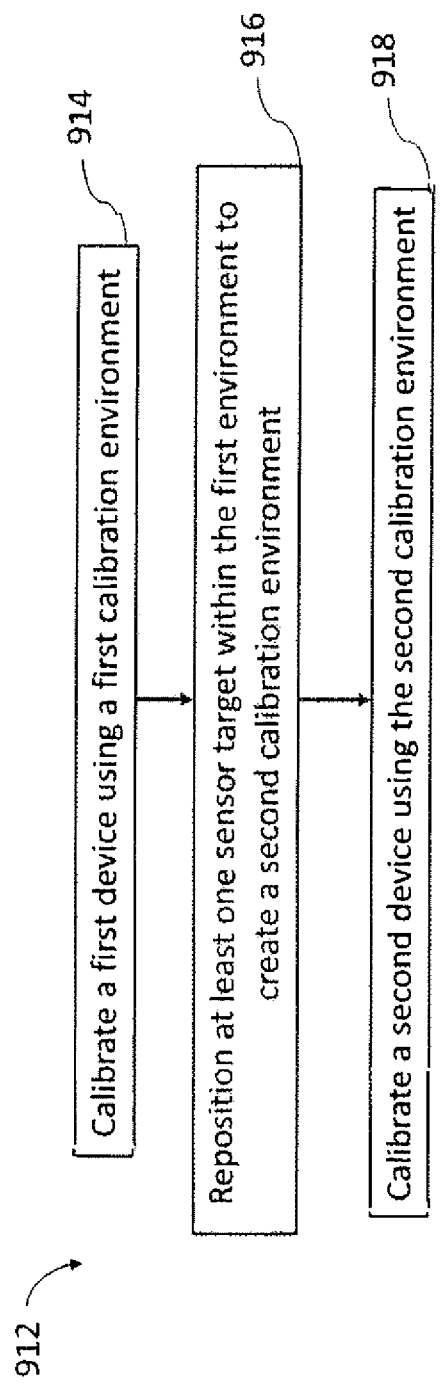
FIG. 9B is a process flow diagram of an exemplary method for an operator to calibrate different robots within the same calibration room by changing the calibration environment.

FIG. 9B is a process flow diagram illustrating an exemplary method 912 for an operator, operating a calibration environment, to calibrate at least two different devices comprising different physical properties such as, but not limited to, sensor locations, sensor types, number of sensors, size, and/or shape according to an exemplary embodiment. As stated above, a calibration environment 100 comprises the physical space and/or location of a calibration environment wherein a calibration environment comprises a specific geometry of sensor targets within the calibration environment 100.

Block 914 illustrates the operator calibrating a first device in a first calibration environment, the first device comprising at least one sensor to be calibrated using methods illustrated in FIG. 9A. Additionally, the first calibration environment comprises a first geometry of sensor targets 102, 104, 106, 108, 110, and/or 112 and a fixed point 116 illustrated in FIGS. 1A-E.

Block 916 illustrates the operator repositioning at least one sensor target within the first calibration environment to create a second calibration environment to calibrate the second device, the second calibration environment comprising a different geometry of sensor targets from the first. Repositioning the sensor targets by the operator may comprise removing, exchanging, adding, moving, and/or rotating at least one sensor target within the first calibration environment to create the second calibration environment such that the second device's sensors may be calibrated from the repositioned targets. The sensor targets of the second environment may comprise any of sensor targets 102, 104, 106, 108, 110, and/or 112 as illustrated in FIG. 1 and may be positioned using methods illustrated in block 902 of FIG. 9A. According to at least one non-limiting exemplary embodiment, both the first and second calibration environments may comprise the same fixed point 116 and rear locking mechanisms 114, 118, and/or 120 illustrated in FIG. 1D.

Block 918 illustrates an operator calibrating the second device using the second calibration environment created in block 916 using methods illustrated in FIG. 9A. It is appreciated by one of ordinary skill in the art that the exemplary method 912 may be continued for further calibration of a third device using a third calibration environment, and so on.

FIG. 10 illustrates an apparatus used by controller 222 to adjust a sensor 1006 based on a calibration reading according to an exemplary embodiment. As illustrated in FIG. 10, sensor 1006 may be a planar LIDAR wherein adjusting screws 1004 may adjust the plane of the planar LIDAR. Controller 222, based on a calibration measurement, may generate an adjustment signal, as previously illustrated in FIG. 8, comprising adjustments to the screws 1004 to be made by correction motors 1002. Correction motors 1002 may comprise some, none, different, or all of the features of actuator units 208 previously illustrated in FIG. 2A and may be configured to adjust corresponding screws 1004 based on the adjustment signal received from controller 222. Correction motors 1002 may be configured to tighten or loosen a corresponding screw 1004 by an amount calculated by controller 222 executing specialized algorithms based on the adjustment signal, causing the plane of the planar LIDAR sensor to be adjusted.

According to at least one non-limiting exemplary embodiment, correction motor 1002 may modify the position of a sensor by providing mechanical input to a mount of the sensor to adjust the orientation of the sensor. In this exemplary embodiment, a correction motor 1002 may be configured to adjust the roll axis of the sensor wherein additional correction motors 1002 may be configured to adjust sensor along positional x, y, and z axis as well as yaw and/or pitch axis. According to at least one non-limiting exemplary embodiment, sensor 1006 may comprise any sensor, of sensor units 214 previously illustrated in FIG. 2A, adjustable by a correction motor 1002 adjusting a screw 1004 or a mounting of the sensor.

Figure 11A:
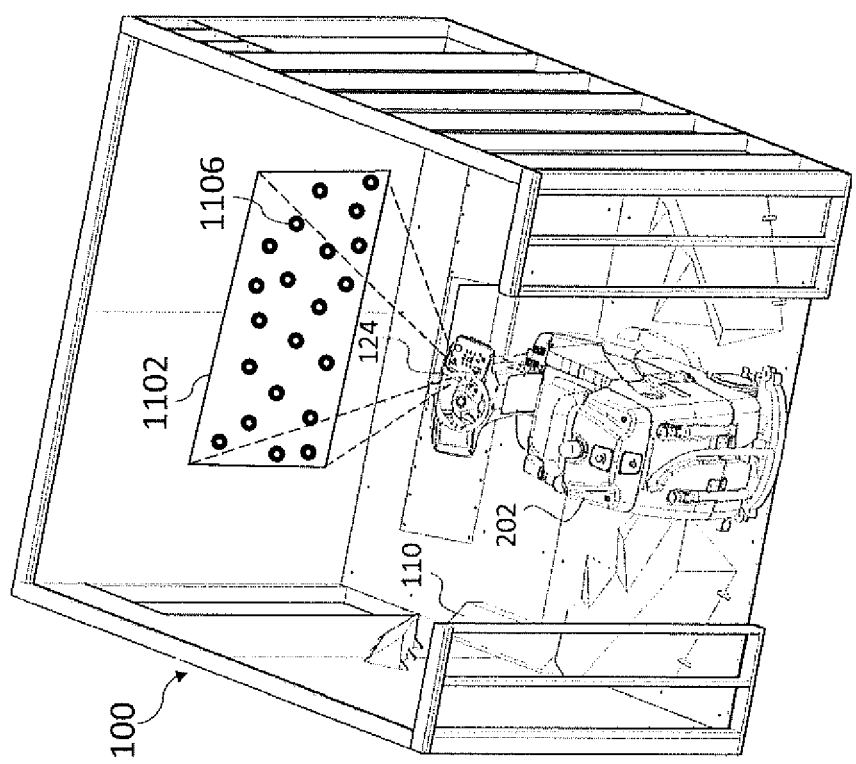
FIG. 11A illustrates a visual target within a calibration room, according to an exemplary embodiment.

FIG. 11A is an overhead view of a calibration environment 100 comprising a visual target 1102, according to an exemplary embodiment. Some sensors on a robot 202 may be calibrated using flat, or two-dimensional, sensor targets. Such sensors may include those which capture images, e.g., color cameras, black/white/greyscale cameras, thermal cameras, depth cameras, and the like. Some of these sensors are unable to be calibrated using three-dimensional shape targets, namely image cameras (i.e., excluding depth cameras) as the three-dimensional structure of these targets may not be completely discernible from two-dimensional imagery alone. Accordingly, in order to calibrate sensors which capture images, the visual target 1102 is utilized within the calibration environment 100.

The visual target 1102 may be placed within the environment 100 such that it is depicted, at least in part, within images captured by one or more image sensors on the robot 202 while the robot 202 is in the fixed position 116, shown in FIG. 1D above (i.e., the illustrated position). It is appreciated by one skilled in the art that the location of the visual target 1102 within the environment 100 is based on the location and field of view of the sensor unit 124, wherein the location of the visual target 1102 is not intended to be limited to any location.

According to at least one non-limiting exemplary embodiment, the calibration environment 100 may only contain visual targets 1102 and may not include any three-dimensional shaped targets, such as targets 102, 104, 106, 108, 110, and 112 shown in FIG. 1A-D above. However, if robot 202 includes a LiDAR sensor (which does not produce imagery), it may be desirable to utilize one or more of the targets 102, 104, 106, 108, 110, and/or 112 to calibrate the LiDAR sensor in addition to the visual targets 1102.

FIG. 11A illustrates a sensor 1104 capturing an image of a visual target 1102 for use in calibrating the sensor 1104, according to an exemplary embodiment. Sensor 1104 may comprise an imaging sensor, such as a(n) RGB/greyscale camera or depth camera, configured to produce images of a visual scene within field of view 1108. The sensor 1104 may be coupled to a robot 202, the robot 102 may be positioned in a fixed and known location within a calibration environment 100; however, the robot 202 has been omitted from the illustration for clarity. The visual target 1102 may be placed within a calibration environment 100 in a known location and may be utilized in addition to or in replacement of any of the sensory targets 102, 104, 106, 108, 110, 112, etc., previously illustrated above.

The visual target 1102 may include a plurality of rings 1106. Each ring 1106 includes a center point at a known location within the calibration environment 100. The known location may be determined using a CAD model of the calibration environment 100 or via a human operator collecting measurements. The rings 1106 may comprise a color which is distinct from a background color of the visual target 1102, such as black rings on a white target 1102 for example. Other colors may be utilized; however, black and white may be preferred to maximize the contrast between the rings 1106 and background for improved visibility of the rings 1106. In some embodiments, the rings 1106 may be placed in an asymmetrical pattern, such as a randomized pattern, for reasons discussed below. Briefly, an asymmetric pattern may improve the calibration performance by removing redundant calibration parameters from consideration, as will be explained in more detail below. Rings 1106 may be painted, drawn, printed, or affixed to (e.g., using Velcro, adhesives, tape, etc.) the visual target 1102. Sensor 1104 may capture an image of the visual target 1102, as shown next in FIG. 11C.

Figure 11B:
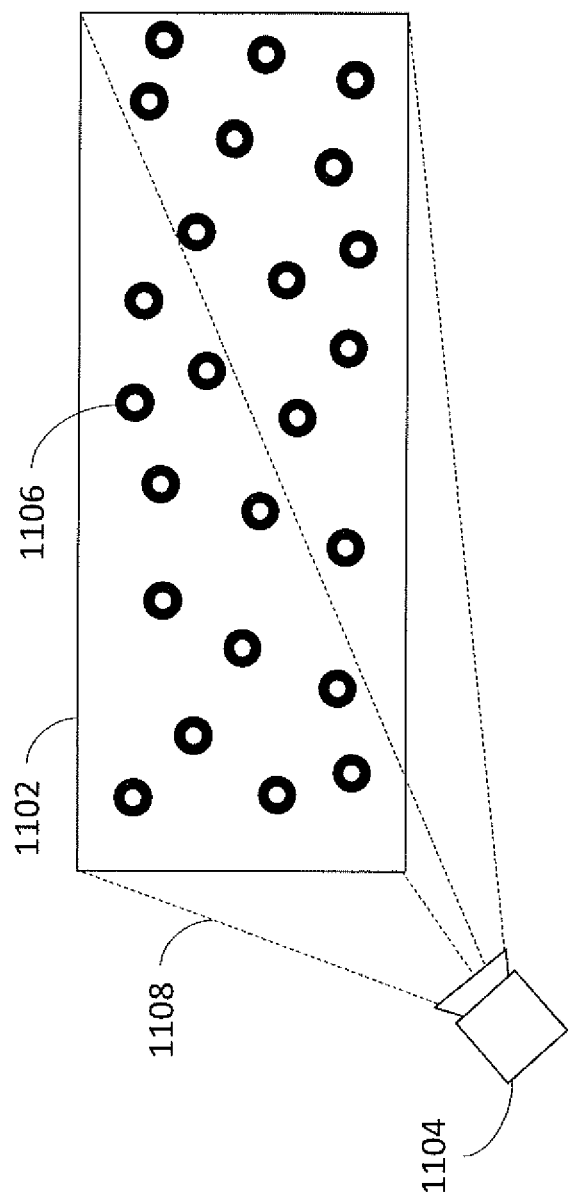
FIGS. 11B-D illustrate a robot calibrating a sensor using a visual target, according to an exemplary embodiment.
Figure 11C:
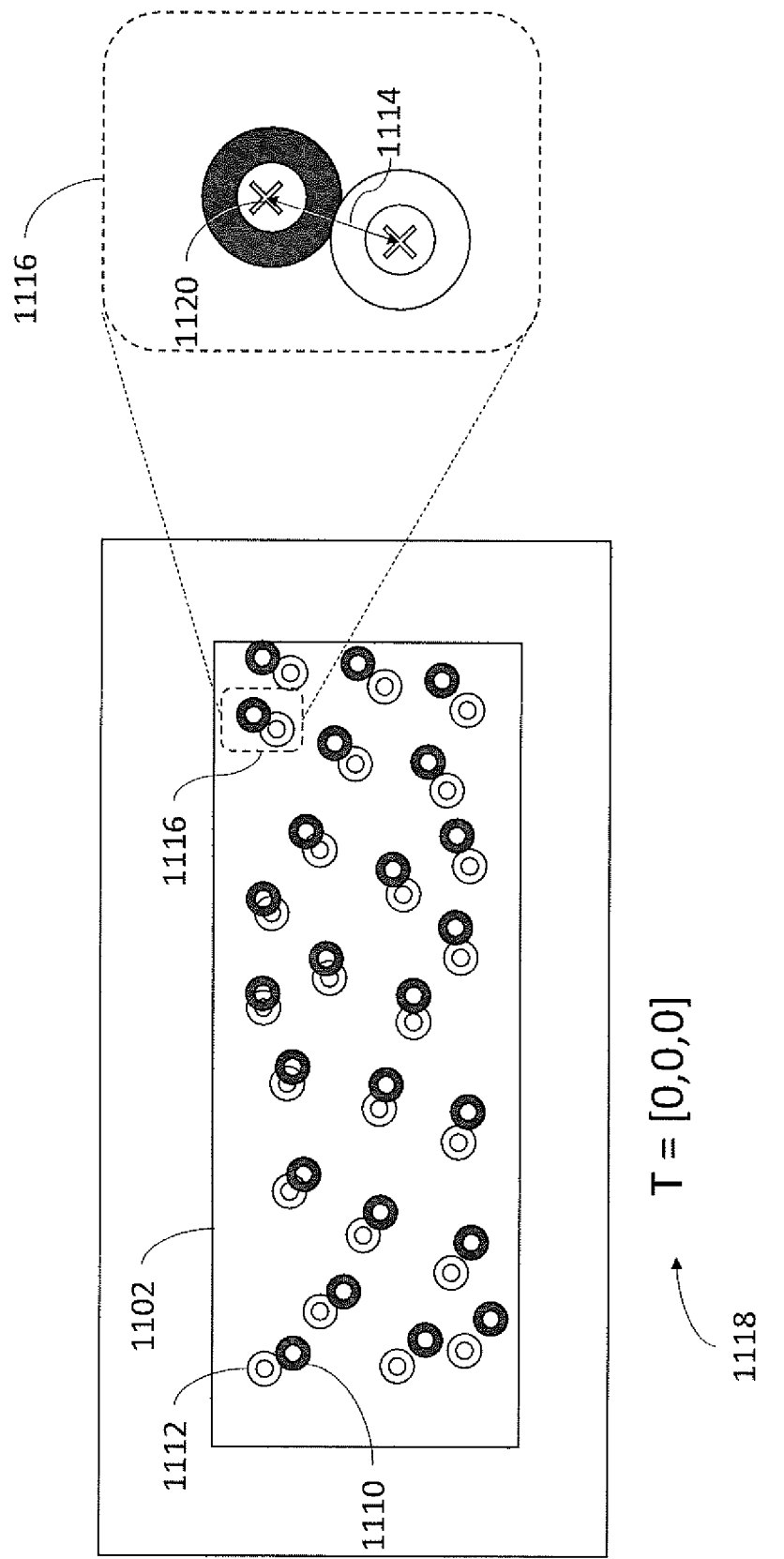

FIG. 11C illustrates an image of the visual target 1102 comprising a plurality of rings 1106 depicted thereon, the image being captured by the sensor 1104 shown in FIG. 11B above superimposed on a reference image of the visual target 1102, according to an exemplary embodiment. The white rings 1112 correspond to the reference image and the black rings 1110 correspond to the depicted locations of the rings 1112 of the visual target 1102 as seen from the sensor 1104. The reference image denotes the true location of the rings 1106, as would be seen from a well calibrated sensor 1104. The reference image may be stored in memory 224 of the robot 202. Stated differently, the white rings 1112 denote the true locations of the rings 1106 of the visual target 1102 whereas the black rings 1110 correspond to the perceived location of the rings 1106 by the sensor 1104, which may not be perfectly calibrated.

Figure 13:
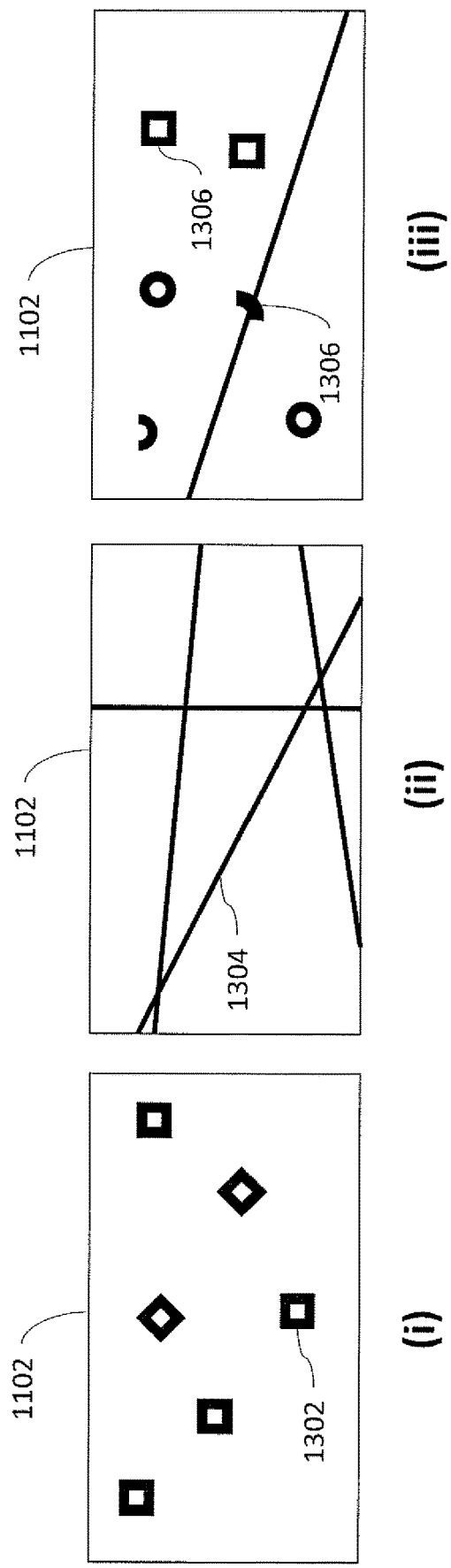
FIGS. 13(i-iii) illustrates various exemplary embodiments of a visual target.

The use of rings 1106, or other shapes (e.g., squares, U-shapes, lines, etc. as shown in FIGS. 13(i-iii) below), enables the controller 222 to easily detect the location of the rings 1110 within the captured image. More specifically, the controller 222 is able to, via executing computer readable instructions, identify the center points 1120 of each of the imaged rings 1110. In some embodiments, the controller 222 may further be configured to detect the shape (i.e., contour) of each ring 1120, including its size, orientation, and distortion (with respect to a perfectly circular ring). The centers 1120 of each ring 1110 may be detected via the controller 118 performing a circularity analysis. The controller 118 may search for radii of circles (i.e., clusters of white pixels) which are within a predetermined range, the range corresponding to a range approximately equal to the radii of rings 1106 plus a margin of error due to erroneous calibration of the camera 1104 (e.g., ±10%, ±20%, etc. of the radius of circles 1106).

To align the two sets of rings 1106 and 1110, the controller 222 may perform various algorithms to determine a transform which, when applied to rings 1110, cause the rings 1110 to align with the reference rings 1106. Such algorithms may include, for example, iterative closest point, gradient descent, nearest neighbor searches, and the like. Nearest neighbor searches may be performed to ensure the controller 222 aligns the rings 1110 with the correct corresponding rings 1106 of the reference data. The transformation may include any number of rotations or translations in 3-dimensional space. Stated differently, controller 222 may virtually rotate/translate point 1202 until the rings 1110 match with rings 1106, wherein the virtual rotations/translations may correspond to the deviation of the sensor 1104 from its ideal position.

The alignment process performed by the controller 222 includes the controller 222 first determining, for each imaged ring 1110, its corresponding ring 1106. Stated differently, the controller 222 determines the "ideal" location for each imaged ring 1110 based on the locations of the rings 1106 in the reference data. Typically, the calibration errors in sensors on a robot 202 are small such that, for each imaged ring 1110, its nearest neighboring ring 1106 in the reference data corresponds to the "ideal" location for the imaged ring 1110. One skilled in the art may additionally increase the space between rings 1106 in the visual target 1102 to ensure that a closest neighboring ring 1106 corresponds to the ideal location of each imaged ring 1110. Box 1116 illustrates a close-up view of two rings 1106 and 1110, wherein ring 1106 comprises the "ideal" location of the imaged ring 1110 if the imaged ring 1110 was imaged using a well calibrated sensor. Controller 222 may perform a circularity analysis to determine the center 1120 of the imaged ring 1110 and compare the center 1120 location with the known location of center 1120 of the reference ring 1106. Such comparison is shown by distance 1114, wherein distance 1114 may be stored as a line segment, a transform (e.g., x, y, and/or θ translation), or similar metric of representing the spatial translation of distance 1114.

Figure 11D:
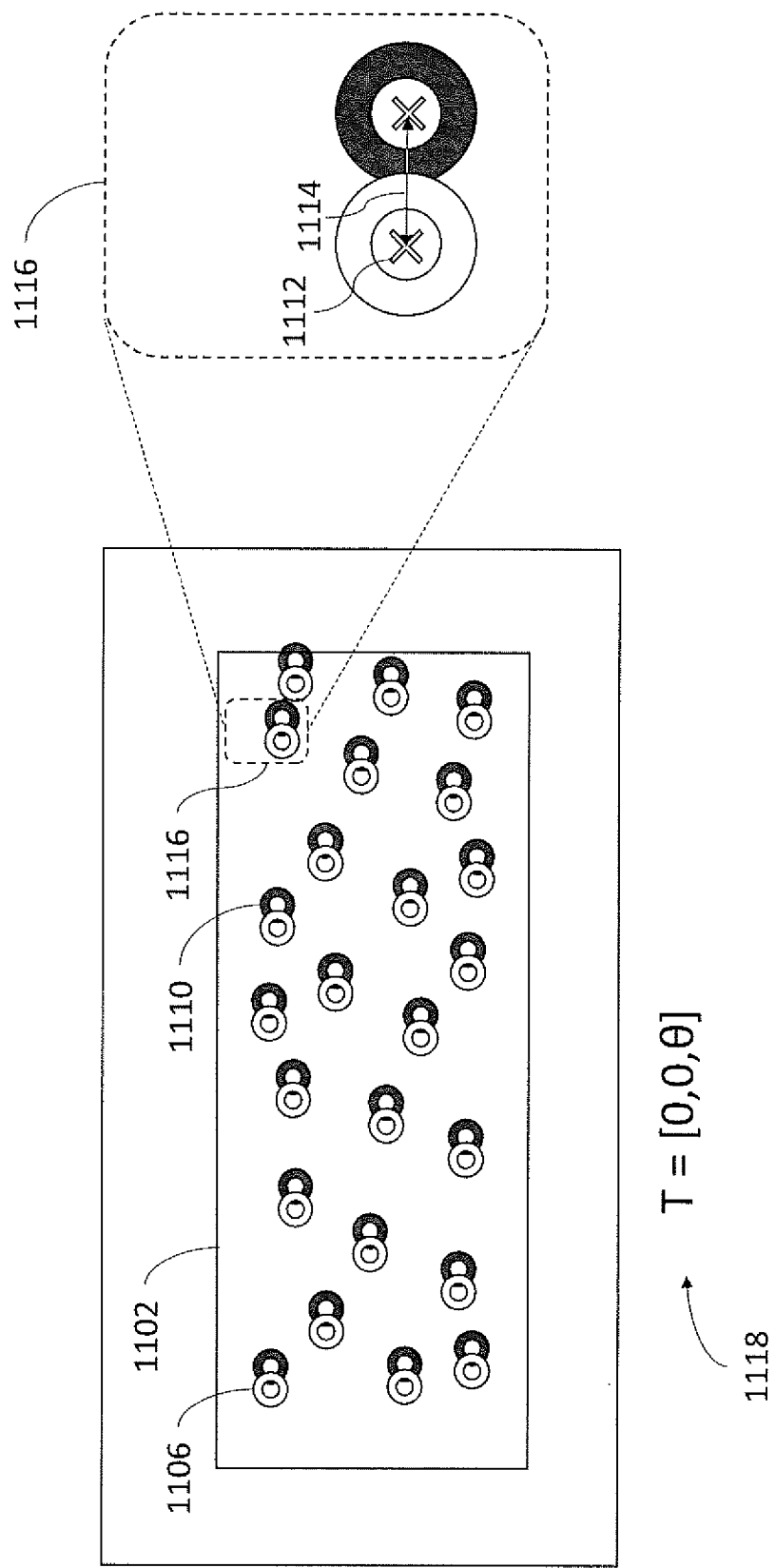

Controller 222 may determine distance 1114 for each pair of neighboring rings 1106, 1110. The plurality of distances 1114 may enable the controller 118 to determine a transform 1118 which, when applied to all imaged rings 1110, causes the imaged rings 1110 to align with reference rings 1106. To illustrate further, FIG. 11D shows the controller 222 determining a rotation which improves the alignment of rings 1106, 1110, the rotation may comprise a portion of transform 1118, according to an exemplary embodiment. After the rotation of θ, the plurality of rings 1106, 1110 are now misaligned only along translational axis (as shown by distance 1114). Accordingly, controller 222 may determine the translation and subsequently update transform 1118 to include [x, 0, θ]. This transform 1118 corresponds to the deviation of the sensor 1104 from its ideal (i.e., calibrated) position. Based on the magnitude of the transform 1118, controller 222 may apply a digital transform to incoming data from the sensor 1104 by adjusting, e.g., location data received or deduced from the sensor 1104 by the transform 1118. For example, when localizing an object using a depth camera or via video analysis, the location of the object may be digitally adjusted by the transform 1118. If transform 1118 is large in magnitude, e.g., over a threshold, the controller 222 may prompt a human operator to manually adjust the sensor 1104.

As mentioned above, the asymmetric pattern of the rings 1106 of the visual target 1102 omits redundant or degenerate calibration solutions (i.e., transforms which cause rings 1110 to align with rings 1106). The asymmetry enables only one transform to exist which aligns the two sets of rings 1106, 1110. In some instances, symmetry may exist, e.g., along the vertical axis, leading to two solutions: (i) (x, y, z, yaw, pitch, roll), and (ii) (x, y, z, yaw, pitch, roll+180°), wherein the latter solution is highly unlikely and may be omitted using thresholds (i.e., it is unlikely the camera sensor 1104 is upside-down on the robot 202).

Figure 12:
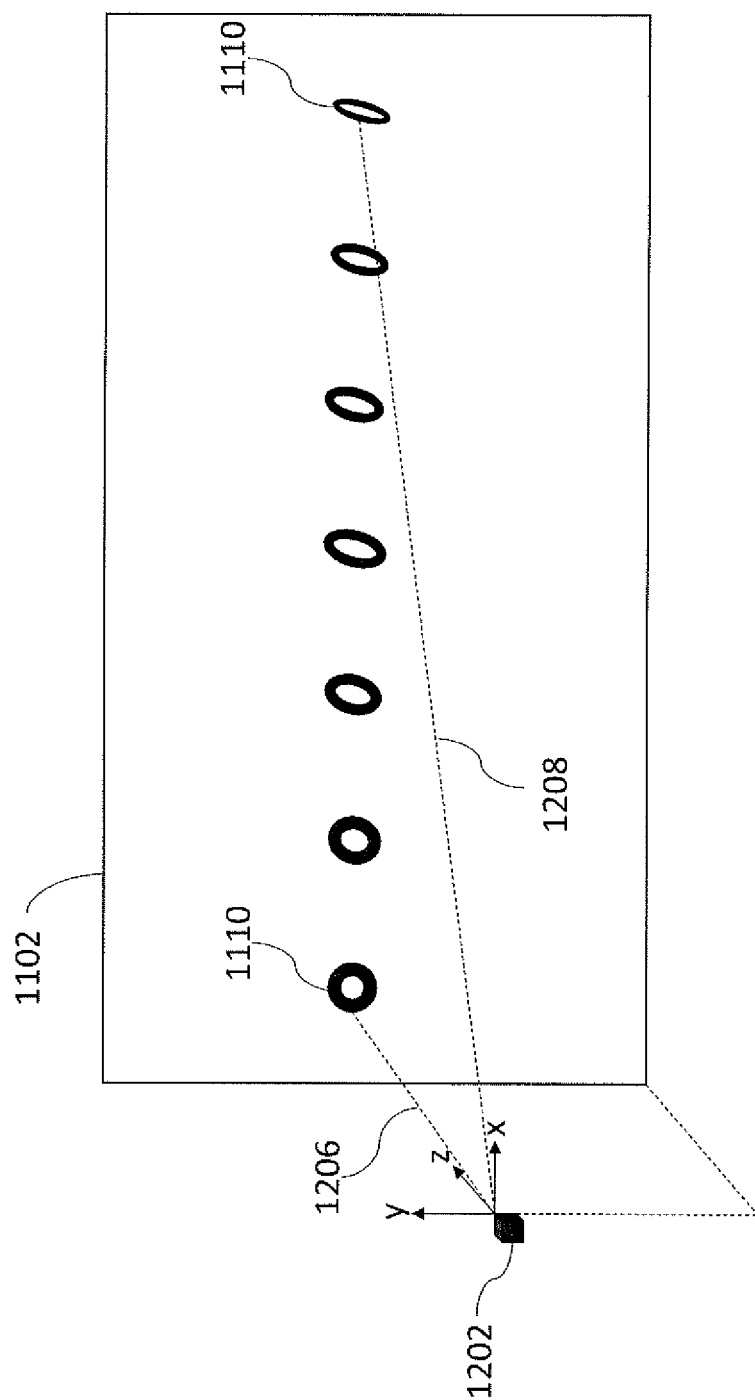
FIG. 12 illustrates possible distortions caused by the use of a visual target, according to an exemplary embodiment.

In some instances, based on the position of the sensor 1104, some of the imaged rings 1110 may become distorted, or non-circular. The distortion of the rings 1110 may be caused, at least in part, because the visual target 1102 is a two dimensional plane which is not always parallel to the image plane of the sensor 1104. To illustrate, FIG. 12 shows the camera sensor 1104 represented by a point 1202 capturing an image of a simplified visual target 1204, according to an exemplary embodiment. The point 1202 may denote the point from which the camera views the world (e.g., using a pin-hole camera model). The point 1202 and leftmost edge of the visual target 1204 may lie along the z-axis, the z-axis points directly forwards from the center of the camera 1104. The first (leftmost) imaged ring 1110 is shown with very little or no distortion as this ring 1110 is oriented substantially parallel to the image plane of the camera (i.e., as shown by line 1206 being substantially along the z-axis). Moving rightwards, the rings 1110 include more and more distortion, which has been greatly exaggerated for clarity. The rightmost imaged ring 1110 may include the most distortion due to the ring 1110 (more specifically, the ring 1106 corresponding to the imaged ring 1110) not being parallel to the image plane of the camera 1104 (i.e., as shown by line 1208 deviating substantially from the z-axis). It is appreciated that the distortion shown in FIG. 12 is greatly exaggerated, wherein typical distortion within images of visual targets 1102 may only include a few pixels of distortion depending on the distance between the target 1102 and the sensor and their relative locations within the calibration environment 100.

Although distortion within imaged rings 1110 may occur due to the relative placements of the visual target 1102 and sensor 1104, distortion may also be caused by erroneous calibration of the sensor 1104. Accordingly, it may be advantageous to account for any distortion by including the distortion in the reference data (i.e., include distortion in rings 1106 in FIG. 11C).

FIGS. 13(*i-iii*) illustrates three additional exemplary embodiments of a visual target 1102, in accordance with some embodiments of the present disclosure. Although the use of rings 1106 above may be preferred due to the rotational invariance of a ring, other shapes may be used, nonetheless. In some instances, use of non-rotational invariant shapes, such as squares, lines, etc., may further constrain the calibration parameters to ensure an accurate transform 1118 is determined. However, identifying the structure/contours/centers of complex shapes may require the use of additional computational resources of controller 222, high resolution camera sensors 1104, and/or time, wherein one skilled in the art may appreciate that the complexity of the shapes may be based on the computational resources (e.g., memory, CPU usage, etc.) available to the robot 202/controller 222.

First, in FIG. 13(*i*), visual target 1102 includes a plurality of squares 1302. When using the visual target 1102 to calibrate a sensor 1104, the controller 222 may align imaged squares with squares of a reference data set by, e.g., aligning the edges or corners of the squares. In some embodiments, controller 222 may determine the center of the squares 1302 in a similar manner as centers 1114 of rings 1106, and subsequently determine a transform 1118 based on the distance between the centers of the imaged squares and reference squares. As shown, some squares 1302 may be rotated to (i) remove symmetry, and (ii) add additional calibration constraints (or data points used for determining transform 1118); however, the use of rotated squares 1302 is not required nor intended to be limiting.

Next, FIG. 13(*ii*) illustrates another embodiment of a visual target 1102 which includes a plurality of non-parallel line segments 1304. Such line segments may be easily detectable due to their contrast on a white background using contour analysis. In some embodiments, due to the simplicity of the shapes (i.e., lines 1304), thresholding may be utilized to identify pixels which depict the lines 1304, thereby yielding the image-space coordinates of the lines 1304. Such image-space coordinates, similar to the location of centers 1120 of imaged rings 1110, may be compared to a reference data set comprising the true locations of the line segments 1304 (if captured by a well calibrated sensor). One drawback in the use of the line segments 1304, however, may include difficulties resolving changes in thickness of the lines 1304, which may correspond to errors in the position of the sensor (i.e., the sensor being further from/closer to the lines 1304/visual target 1102).

And, lastly, FIG. 13(*iii*) illustrates another embodiment of a visual target 1102 which utilizes a plurality of shapes 1306 including squares, rings, half-circles, line segments, and the like. Images of this visual target 1102 may be compared with a reference using substantially similar methods as those described above. Use of a plurality of varying shapes may be advantageous in further constraining possible poses of the sensor, but comes with a drawback of increased computational complexity (i.e., increased CPU usage, memory usage, time, etc.) in identifying and aligning the various shapes.

It will be appreciated by one skilled in the art that a visual target 1102 is not indented to be limited to any specific arrangement of shapes as shown in FIGS. 11A-D or FIGS. 13(*i-iii*), wherein the shapes of the visual target 1102 may be arranged in any arrangement desirable by the operator. Preferably, the pattern of shapes is asymmetrical, and the shapes are separated sufficiently such that a nearest neighbor search would return the correct neighboring ring 1106 (i.e., correctly identify which ring 1106 an imaged ring 1110 corresponds to). Horizontal symmetry may be incorporated if proper constraints on the possible poses of the sensor are imposed as calibration using a horizontally symmetrical visual target 1102 yields a first and a second solution. The second solution corresponds to the camera being flipped 1800 from the first solution which, reasonably, cannot be possible if the camera is mounted on a robotic device.

Figure 14:
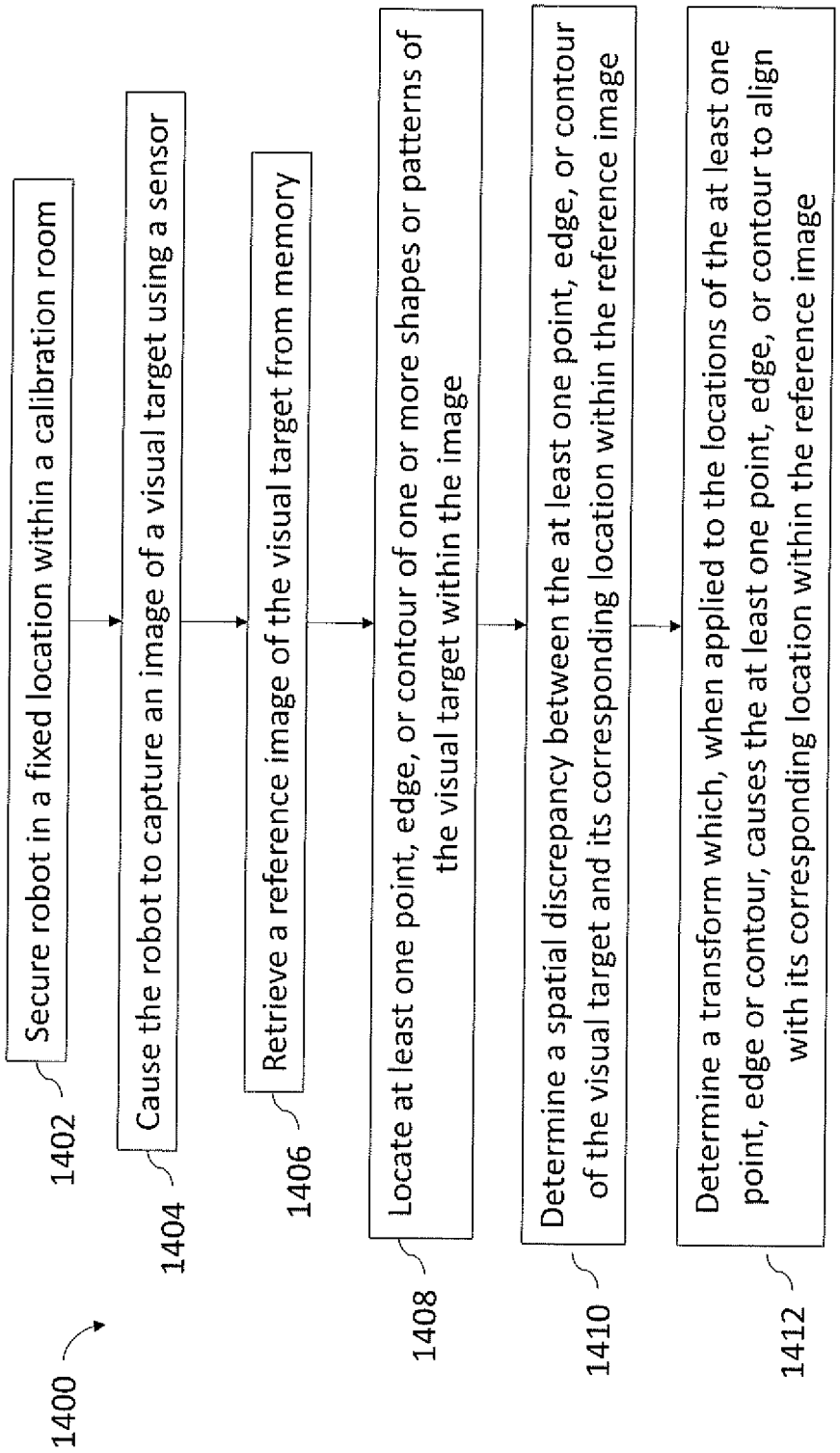
FIG. 14 is a process flow diagram illustrating a method for a controller of a robot to calibrate a sensor using a visual target, according to an exemplary embodiment.

Next, FIG. 14 will be discussed. FIG. 14 is a process flow diagram illustrating a method 1400 for a controller 222 of a robot 202 to calibrate a sensor using a visual target, according to an exemplary embodiment. Steps of method 1400 may be effectuated via the controller 222 executing computer readable instructions from memory 224. Method 1400 may be repeated to calibrate multiple sensors on the robot 102. The sensor may comprise any sensor configured to, at least in part, capture images such as depth cameras, imaging cameras, infrared cameras, and the like. As used herein, a transform comprises at least one of a translation and/or rotation.

Block 1402 includes the robot 222 being secured in a fixed location 116 within the calibration room 100. Robot 222 may autonomously navigate to the location 116; however, it may be desired for a human to manually drive/move the robot to the location 116 as the calibration of the sensors on the robot 222 have not been verified.

Block 1404 includes the controller 222 causing the robot 202 to capture an image of a visual target 1102 using the sensor. The image may be captured in response to a user input to a user interface unit 212, such as the user input and user interface shown in FIG. 7A-C.

Block 1406 includes the controller 222 receiving a reference image of the visual target 1102 from memory 224. The reference image comprises an image of the visual target 1102 as captured by a well-calibrated sensor. The reference image may denote the ideal locations of various shapes/patterns of the visual target 1102.

Block 1408 includes the controller 222 locating at least one point, edge or contour of the various shapes/patterns of the visual target 1102 within the image taken thereof in block 1404. For example, the controller 222 may perform a circularity analysis to determine the locations of various rings of a visual target 1102 comprising a plurality of rings. In another example, edge or contour detection may be utilized to determine the boundaries of other shapes, such as squares, lines, or other shapes, as shown in FIG. 13(*i-iii*) for example. Visual target 1102 preferably comprises a minimum number (e.g., two) of high contrasting colors (e.g., black and white) to enable the shapes/patterns to be easily discernible within the captured image. Various other methods are considered to detect the location and size/shape of the patterns of the visual target. In some embodiments, a color value threshold may be used provided the colors used in the visual target are of high contrast.

Block 1410 includes the controller 222 determining a spatial discrepancy between the at least one point, edge, or contour of the one or more shapes or patterns of image of the visual target 1102 and its corresponding location in the reference image. The spatial discrepancy may comprise an image-space translation or transformation which causes the pattern/shapes of the captured image of the visual target 1102 to align with the corresponding pattern/shapes of the reference image. Such transformation is shown visually via the exemplary embodiment in FIG. 11C-11D. The translation or transformation may include rotations and translations of the image.

In some instances, scale discrepancies between the reference image and the captured image may yield pose information relating to the image sensor. To illustrate using the axis defined in FIG. 12 (i.e., with z-axis pointing outward from the sensor), if a ring 1110 on the left side of the imaged visual target is smaller than it should appear, based on the reference, whilst a ring 1110 on the right side of the imaged visual target is larger than it should appear, the controller 222 may determine that the discrepancy in scale may be based on improper pose of the sensor. Specifically, its rotation along the y-axis.

The transform used by the controller 222 to align the pattern/shapes of the captured image to the reference image may correspond to the discrepancy between the current (x, y, z, yaw, pitch, roll) pose of the sensor and its ideal, well-calibrated pose. Block 1412 includes the controller 222 determining this transform based on the captured image, when the transform is applied, aligning with the reference image. In some instances, the transform is of small magnitude which enables the controller 222 to digitally manipulate data from the sensor (e.g., if the sensor is a depth camera, position/location data may be shifted by the determined transform) such that the data appears to be captured from a well calibrated sensor. If the magnitude of the transform is large, e.g., beyond the safe operable range, human intervention may be required to manually adjust the sensor. It is preferable to repeat the calibration process after any manual adjustment to eliminate human error.

It will be recognized that, while certain aspects of the disclosure are described in terms of a specific sequence of steps of a method, these descriptions are only illustrative of the broader methods of the disclosure and may be modified as required by the application. Certain steps may be rendered unnecessary or optional under certain circumstances. Additionally, certain steps or functionality may be added to the disclosed implementations, or the order of performance of two or more steps permuted. All such variations are encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, +5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein, "defined" or "determined" may include "predefined" or "predetermined" and/or otherwise determined values, conditions, thresholds, measurements, and the like.

What is claimed is:

1. A system comprising an environment for calibrating sensors on a robot, comprising:
    a fixed location to secure the robot, the robot being configured to collect data from at least one sensor unit from the fixed location; and
    at least one visual target, the at least one visual target comprises a plurality of two-dimensional shapes, the plurality of shaped being detectable by the at least one sensor unit of the robot, the visual target is different from a reference target, the reference target corresponds to sensor data of the at least one sensor target from a calibrated sensor, and the visual target comprises a plurality of two-dimensional, black and white shapes arranged in an asymmetrical pattern,
    adjustment of location of the at least one sensor unit of the robot based on rotational alignment and translational alignment of the at least one sensor unit;
    wherein the adjustment of location of the at least one sensor unit is based on transforming the visual target onto the reference target such that a center of the visual target is aligned to a center of the reference target.

2. The system claim 1, wherein,
    the plurality of two-dimensional shapes are arranged in an asymmetric pattern.

3. The system claim 1, wherein,
    the plurality of two-dimensional shapes are black and white.

4. A robot, comprising:
    at least one sensor coupled to the robot; and
    at least one controller configured to execute computer readable instructions stored on a memory to:
        capture data from the at least one sensor, the data represents at least one visual target detected within the field of view of the at least one sensor;
        determine, for each sensor of the at least one sensor, a difference between representation of the at least one visual target in the data and a reference target, the reference target corresponds to sensor data of the at least one sensor target from a calibrated sensor, the visual target is different from a reference target, the reference target corresponds to sensor data of the at least one sensor target from the calibrated sensor, and the visual target comprises a plurality of two-dimensional, black and white shapes arranged in an asymmetrical pattern; and determine at least one transformation for each one of the at least one sensor based on the difference, the at least one transformation causes data from the at least one sensor to match the reference target, adjust location of the at least one sensor of the robot based on rotational alignment and translational alignment of the at least one sensor unit;

wherein the adjustment of location of the at least one sensor is based on transforming the visual target onto the reference target such that a center of the visual target is aligned to a center of the reference target.

5. The robot of claim 4, wherein,
the robot is affixed to a predetermined location prior to capturing data from the at least one sensor.

6. The robot of claim 4, wherein,
the at least one sensor target includes a plurality of two-dimensional rings.

7. The robot of claim 6, wherein,
the plurality of two-dimensional rings are arranged in an asymmetrical pattern.

8. The robot of claim 6, wherein,
the at least one sensor is configured to capture images of the visual target; and
the difference corresponds to discrepancies between one or more of the shape, size, and location of the plurality of rings in the captured images and their respective shape, size, and location in the reference target.

9. The robot if claim 4, wherein the at least one controller is further configured to execute the computer readable instructions to:
capture the sensor data in response to a user input to a user interface.

10. A method for calibrating at least one sensor on a robot, comprising:
capturing data from the at least one sensor while the robot is within a calibration room, the data includes an image of a visual target within the calibration room and within a field of view of the at least one sensor;

determining, for each sensor, a difference between the representation of the visual target in the data and a reference target, the reference target corresponds to sensor data of the at least one sensor target from a calibrated sensor, the visual target is different from a reference target, the reference target corresponds to sensor data of the at least one sensor target from the calibrated sensor, and the visual target comprises a plurality of two-dimensional, black and white shapes arranged in an asymmetrical pattern; and determining at least one transformation for each of the at least one sensor based on the difference, the at least one transformation causes data from the at least one sensor to match the reference target, adjusting location of the at least one sensor of the robot based on rotational alignment and translational alignment of the at least one sensor; wherein the adjustment of location of the at least one sensor is based on transforming the visual target onto the reference target such that a center of the visual target is aligned to a center of the reference target.

11. The method of claim 10, wherein,
the robot is affixed to a predetermined location prior to capturing data from the at least one sensor.

12. The method of claim 10, wherein,
the at least one sensor target includes a plurality of two-dimensional rings.

13. The method of claim 12, wherein,
the plurality of two-dimensional rings are arranged in an asymmetrical pattern.

14. The method of claim 12, wherein,
the at least one sensor is configured to capture images of the visual target; and
the difference corresponds to discrepancies between one or more of the shape, size, and location of the plurality of rings in the captured images and their respective shape, size, and location in the reference.

15. The method if claim 10, further comprising:
capturing the sensor data in response to a user input to a user interface.

16. A robot, comprising:
at least one sensor coupled to the robot; and
at least one controller configured to execute computer readable instructions stored on a memory to:
capture data from the at least one sensor in response to an input to a user interface, the data represents a visual target detected within the field of view of the at least one sensor;

determine, for each sensor, a difference between representation of the visual target in the data and a reference target, the reference target corresponds to sensor data of the at least one sensor target from a calibrated sensor, the visual target is different from a reference target, the reference target corresponds to sensor data of the at least one sensor target from the calibrated sensor; and determine at least one transformation for each of the at least one sensor based on the difference, the at least one transformation causes data from the at least one sensor to match the reference target;

adjust location of the at least one sensor of the robot based on rotational alignment and translational alignment of the at least one sensor;

wherein,
the robot is affixed to a predetermined location prior to capturing data from the at least one sensor;
the at least one visual target includes a plurality of two-dimensional rings;
the plurality of two-dimensional rings are arranged in an asymmetrical pattern;
the at least one sensor is configured to capture images of the sensor target; and
the difference corresponds to discrepancies between one or more of the shape, size, and location of the plurality of rings in the captured images and their respective shape, size, and location in the reference;
the at least one visual target includes a plurality of two-dimensional, black and white shapes arranged in an asymmetrical pattern; and
the adjustment of location of the at least one sensor is based on transforming the visual target onto the reference target such that a center of the visual is aligned to a center of the reference target.

* * * * *